US012720448B2

(12) United States Patent
Nadakuduti et al.

(10) Patent No.: US 12,720,448 B2
(45) Date of Patent: Aug. 25, 2026

(54) RADIO FREQUENCY EXPOSURE MANAGEMENT FOR MULTIPLE RADIOS

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 321 days.

(21) Appl. No.: 18/545,751

(22) Filed: Dec. 19, 2023

(65) Prior Publication Data

US 2024/0214953 A1 Jun. 27, 2024

Related U.S. Application Data

(60) Provisional application No. 63/476,618, filed on Dec. 21, 2022.

(51) Int. Cl.
*H04W 52/36* (2009.01)
*H04B 1/3827* (2015.01)

(52) U.S. Cl.
CPC ........ *H04W 52/367* (2013.01); *H04B 1/3838* (2013.01)

(58) Field of Classification Search
CPC .. H04W 52/36; H04W 52/367; H04B 1/3827; H04B 1/3838
See application file for complete search history.

(56) References Cited

U.S. PATENT DOCUMENTS

| | | | | |
|---|---|---|---|---|
| 9,414,333 | B2 * | 8/2016 | Hart | H04L 1/0028 |
| 10,652,833 | B2 * | 5/2020 | Nadakuduti | H04W 52/225 |
| 11,611,398 | B2 * | 3/2023 | Moision | H04B 10/564 |
| 11,716,695 | B2 * | 8/2023 | Curtiss | H04W 52/245 455/522 |
| 11,792,747 | B2 * | 10/2023 | Sambhwani | H04W 52/42 455/522 |
| 11,871,359 | B2 * | 1/2024 | Lu | H04W 52/283 |
| 11,917,559 | B2 * | 2/2024 | Nadakuduti | H04W 52/367 |
| 11,924,783 | B2 * | 3/2024 | Yu | H04B 17/103 |
| 11,990,928 | B2 * | 5/2024 | Derat | G01R 29/0814 |
| 12,143,938 | B2 * | 11/2024 | Lu | H04W 52/225 |
| 12,289,692 | B2 * | 4/2025 | Lin | H04W 52/241 |
| 12,328,682 | B2 * | 6/2025 | Liu | H04W 52/346 |
| 2020/0015171 | A1 * | 1/2020 | Nadakuduti | H04W 52/225 |

(Continued)

OTHER PUBLICATIONS

International Search Report and Written Opinion—PCT/US2023/085111—ISA/EPO—Apr. 22, 2024.

*Primary Examiner* — Hai V Nguyen
(74) *Attorney, Agent, or Firm* — Patterson + Sheridan, LLP

(57) ABSTRACT

Techniques and apparatus for radio frequency (RF) exposure management for multiple radios are described. An example method of wireless communication by a wireless device generally includes determining a first exposure associated with a first radio for a first transmission in a first time interval; determining a first allowable transmit power associated with a second radio for a second time interval based at least in part on the first exposure associated with the first radio; and transmitting a first signal at a first transmit power in the second time interval using the second radio based on the first allowable transmit power.

29 Claims, 9 Drawing Sheets

(56) References Cited

U.S. PATENT DOCUMENTS

| | | | | |
|---|---|---|---|---|
| 2022/0159582 | A1* | 5/2022 | Lu | H04W 52/225 |
| 2022/0369246 | A1* | 11/2022 | Lin | H04W 52/223 |
| 2023/0089326 | A1* | 3/2023 | Sergeev | H04B 7/0632<br>375/267 |
| 2023/0156625 | A1* | 5/2023 | Liu | H04W 52/346<br>455/522 |
| 2023/0170950 | A1* | 6/2023 | Zhang | H04B 7/0456<br>375/262 |

* cited by examiner

RADIO FREQUENCY EXPOSURE MANAGEMENT FOR MULTIPLE RADIOS

CROSS-REFERENCE TO RELATED APPLICATION

This application claims the benefit of U.S. Provisional Patent Application Ser. No. 63/476,618, filed Dec. 21, 2022, which is hereby incorporated by reference herein in its entirety for all applicable purposes.

FIELD OF THE DISCLOSURE

Aspects of the present disclosure relate to wireless communications, and more particularly, to radio frequency (RF) exposure compliance.

DESCRIPTION OF RELATED ART

Wireless communication systems are widely deployed to provide various telecommunication services such as telephony, video, data, messaging, broadcasts, etc. Modern wireless devices (such as cellular telephones) are generally mandated to meet radio frequency (RF) exposure limits set by certain governments and international standards and regulations. To ensure compliance with the standards, such devices typically undergo an extensive certification process prior to being shipped to market. To ensure that a wireless device complies with an RF exposure limit, techniques have been developed to enable the wireless device to assess RF exposure from the wireless device and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide advantages that include improved wireless communication performance.

Certain aspects of the subject matter described in this disclosure can be implemented in a method for wireless communication by a wireless device. The method generally includes determining a first exposure associated with a first radio for a first transmission in a first time interval; determining a first allowable transmit power associated with a second radio for a second time interval based at least in part on the first exposure associated with the first radio; and transmitting a first signal at a first transmit power in the second time interval using the second radio based on the first allowable transmit power.

Certain aspects of the subject matter described in this disclosure can be implemented in an apparatus for wireless communication. The apparatus generally includes one or more memories collectively storing executable instructions and one or more processors coupled to the one or more memories. The one or more processors are collectively configured to execute the executable instructions to cause the apparatus to determine a first exposure associated with a first radio for a first transmission in a first time interval, determine a first allowable transmit power associated with a second radio for a second time interval based at least in part on the first exposure associated with the first radio, and control transmission of a first signal at a first transmit power in the second time interval using the second radio based on the first allowable transmit power.

Certain aspects of the subject matter described in this disclosure can be implemented in an apparatus for wireless communication. The apparatus generally includes means for determining a first exposure associated with a first radio for a first transmission in a first time interval. The apparatus also includes means for determining a first allowable transmit power associated with a second radio for a second time interval based at least in part on the first exposure associated with the first radio. The apparatus further includes means for transmitting a first signal at a first transmit power in the second time interval using the second radio based on the first allowable transmit power.

Certain aspects of the subject matter described in this disclosure can be implemented in a computer-readable medium. The computer-readable medium has instructions stored thereon, that when executed by an apparatus, cause the apparatus to perform an operation. The operation includes determining a first exposure associated with a first radio for a first transmission in a first time interval. The operation also includes determining a first allowable transmit power associated with a second radio for a second time interval based at least in part on the first exposure associated with the first radio. The operation further includes transmitting a first signal at a first transmit power in the second time interval using the second radio based on the first allowable transmit power.

Other aspects provide: an apparatus operable, configured, or otherwise adapted to perform any one or more of the aforementioned methods and/or those described elsewhere herein; a non-transitory, computer-readable medium comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
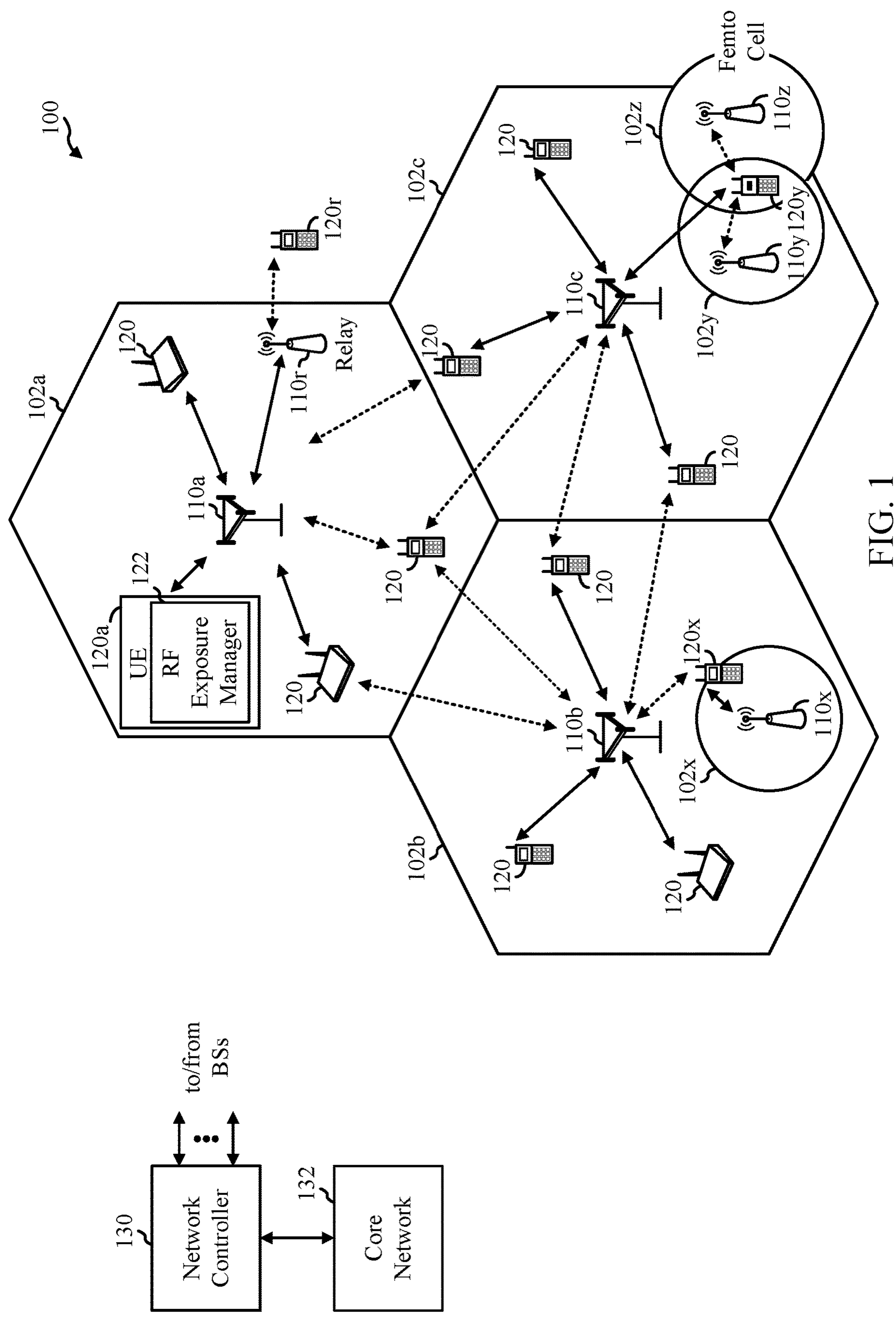
FIG. 1 is a block diagram conceptually illustrating an example wireless communication network.

Aspects of the present disclosure provide apparatus, methods, processing systems, and computer-readable mediums for radio frequency (RF) exposure management for multiple radios.

In some cases, a wireless device may be equipped with multiple radios for wireless communications, such as code division multiple access (CDMA), an Evolved Universal Terrestrial Radio Access (E-UTRA), Fifth Generation New Radio (5G NR), Institute of Electrical and Electronics Engineers (IEEE) 802.11, Bluetooth, Non-Terrestrial Network, etc. For example, some wireless devices may support multi-mode (e.g., E-UTRA and 5G NR, 5G NR and IEEE 802.11, etc.) and/or multi-band (e.g., sub-6 gigahertz (GHz) bands and millimeter wave (mmWave) bands) communications via multiple transmit antennas (or radios) for simultaneous or concurrent transmissions. To ensure compliance with the RF exposure limit, the wireless device may limit the maximum combined instantaneous transmit power for the multi-mode/multi-band communications. To account for the multi-radio communications, the wireless device may be configured with a maximum allowable transmit power per radio for each transmission scenario including single radio and multi-radio scenarios (e.g., a multi-mode/multi-band scenario), where a transmission scenario may correspond to one or more radios, one or more bands, one or more antennas, and/or one or more exposure scenarios (e.g., head exposure, extremity exposure, body exposure, or hot spot exposure) used for transmission(s) in a time interval. The wireless device may be configured with a look-up table of maximum allowable transmit powers corresponding to various transmission scenarios, and the wireless device may use the specific value(s) of the maximum allowable transmit powers from the look-up table depending on the transmission scenario. For multi-radio scenarios, the look-up table may have prelimited backoffs for each of the radios.

Aspects of the present disclosure provide apparatus and methods for RF exposure management for multiple radios. A wireless device may evaluate the RF exposure compliance sequentially per radio, such that the combined transmit powers determined for each radio in a different time interval among a sequence of time intervals complies with the RF exposure limit. For example, for a future time interval, the wireless device may determine a transmit power for a first radio based on the past RF exposure produced by a second radio in a past time interval. The transmit power for the first radio may be the remaining transmit power available for transmission in the future time interval after accounting for the past RF exposure produced by the second radio. The wireless device may continue to perform such a multi-radio exposure evaluation. For example, the wireless device may first determine one radio's RF exposure and corresponding transmit power associated with a first time interval (e.g., the one radio being a higher priority or primary radio), and any remaining available RF exposure can be used for another radio (e.g., a lower priority or secondary radio) in a second time interval following the first time interval. The wireless device may expand the sequential exposure evaluation to any number of radios. For example, a third time interval (which may be the same or different from the second time interval) may be used for a third radio (e.g., an even lower priority or tertiary radio), which can use the remaining exposure left over from the combined exposure of the first radio and the second radio.

The apparatus and methods for multi-radio RF exposure management described herein may facilitate improved wireless communication performance (e.g., improved signal quality at the receiver, lower latencies, higher throughput, etc.). For example, the multi-radio RF exposure management may allow the wireless device to evaluate RF exposure per time interval and distribute any remaining exposure to other radios. The multi-radio RF exposure management may allow the wireless device to select a relatively high priority radio for prioritized allocation of exposure, which may improve the wireless communication performance for a particular radio.

As used herein, a radio may refer to one or more active bands, transceivers, and/or radio access technologies (RATs) (e.g., code division multiple access (CDMA), Long Term Evolution (LTE), NR, IEEE 802.11, Bluetooth, etc.) used for wireless communications. For example, for uplink carrier aggregation or dual connectivity in LTE and/or NR, each of the active component carriers (or serving cells) used for wireless communications may be treated as a separate radio. Similarly, multi-band transmissions for IEEE 802.11 communications may be treated as separate radios for each band (e.g., 2.4 GHz, 5 GHZ, or 6 GHz).

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (cMBB) targeting wide bandwidth (e.g., 80 megahertz (MHz) or beyond), mmWave targeting high carrier frequency (e.g., 24 GHz to 53 GHz or beyond), massive machine type communications (MTC) (mMTC) targeting non-backward compatible MTC techniques, and/or mission critical targeting ultra-reliable low-latency communications (URLLC). These services may include latency and reliability specifications. These services may also have different transmission time intervals (TTIs) to meet respective quality of service (QOS) specifications. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a Second Generation (2G)/Third Generation (3G) network), or a code division multiple access (CDMA) system (e.g., a 2G/3G network), or may be configured for communications according to an IEEE standard such as one or more of the 802.11 standards, etc. As shown in FIG. 1, the UE 120*a* includes an RF exposure manager 122 that ensures RF exposure compliance across multiple radios, in accordance with aspects of the present disclosure.

As illustrated in FIG. 1, the wireless communication network 100 may include a number of BSs 110*a*-110*z* (each also individually referred to herein as BS 110 or collectively as BSs 110) and other network entities. A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b*, and 110*c* may be macro BSs for the macro cells 102*a*, 102*b*, and 102*c*, respectively. The BS 110*x* may be a pico BS for a pico cell 102*x*. The BSs 110*y* and 110*z* may be femto BSs for the femto cells 102*y* and 1022, respectively. A BS may support one or multiple cells.

The BSs 110 communicate with UEs 120*a*-120*y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In some aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

The term "beam" may be used in the present disclosure in various contexts. Beam may be used to mean a set of gains and/or phases (e.g., pre-coding weights or co-phasing weights) applied to antenna elements in the UE and/or BS for transmission or reception. The term "beam" may also refer to an antenna or radiation pattern of a signal transmitted while applying the gains and/or phases to the antenna elements. Other references to beam may include one or more properties or parameters associated with the antenna (radiation) pattern, such as angle of arrival (AoA), angle of departure (AoD), gain, phase, directivity, beam width, beam direction (with respect to a plane of reference) in terms of azimuth and elevation, peak-to-side-lobe ratio, or an antenna port associated with the antenna (radiation) pattern. The term "beam" may also refer to an associated number and/or configuration of antenna elements (e.g., a uniform linear array, a uniform rectangular array, or other uniform array).

Figure 2:
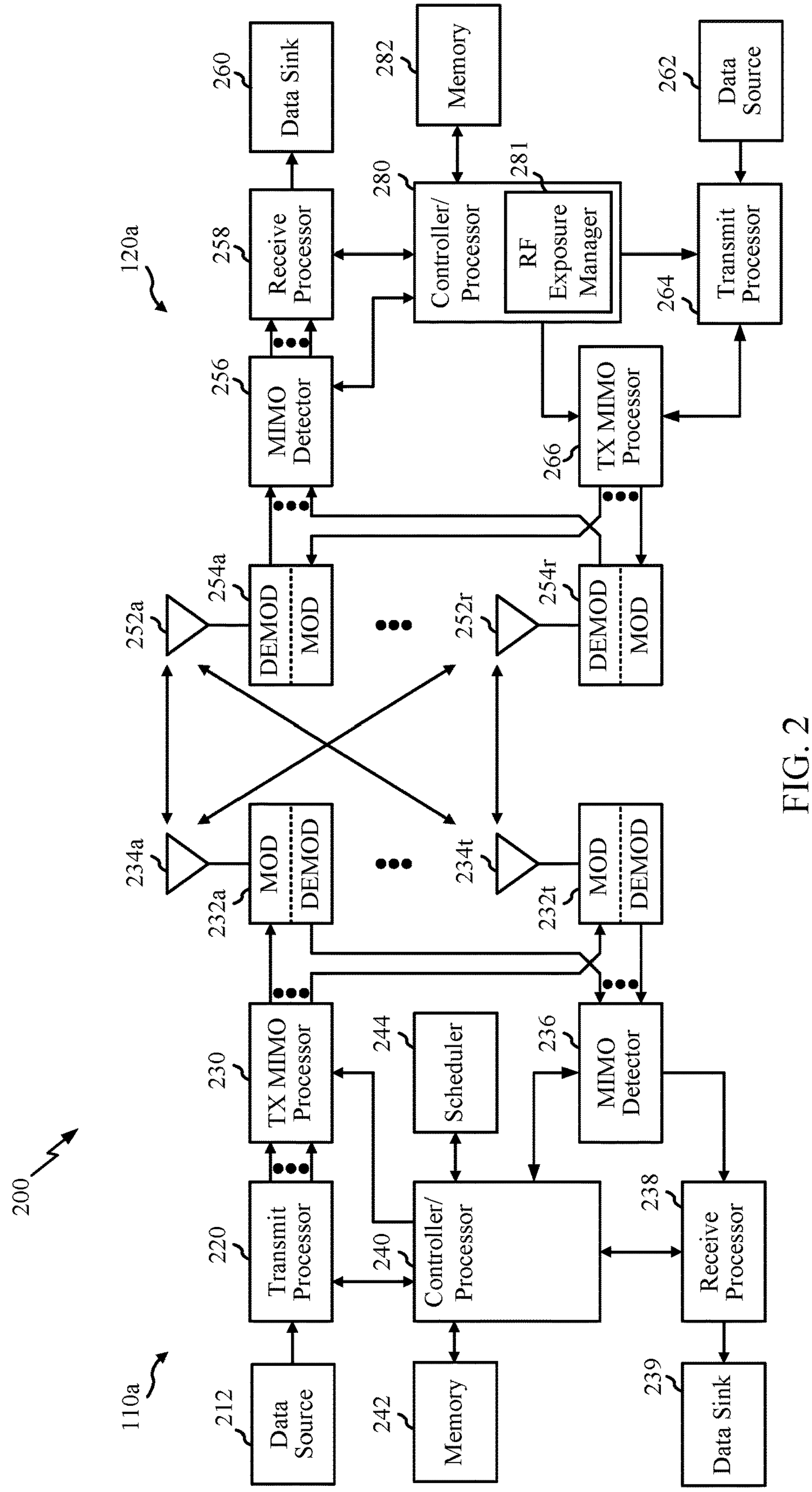
FIG. 2 is a block diagram conceptually illustrating a design of an example base station (BS) and user equipment (UE).

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for orthogonal frequency division multiplexing (OFDM), etc.) to obtain an output sample stream. Each of the transceivers 232*a*-232*t* may further process (e.g., convert to analog, amplify, filter, and upconvert) the output sample stream to obtain a downlink signal. Downlink signals from the transceivers 232*a*-232*t* may be transmitted via the antennas 234*a*-234*t*, respectively.

At the UE 120*a*, the antennas 252*a*-252*r* may receive the downlink (DL) signals from the BS 110*a* and may provide received signals to the transceivers 254*a*-254*r*, respectively. The transceivers 254*a*-254*r* may condition (e.g., filter, amplify, downconvert, and digitize) a respective received signal to obtain input samples. Each demodulator (DEMOD) in the transceivers 232*a*-232*t* may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254*a*-254*r* (e.g., for single-carrier frequency division multiplexing (SC-FDM), etc.), and transmitted to the BS 110*a*. At the BS 110*a*, the uplink (UL) signals from the UE 120*a* may be received by the antennas 234, processed by the demodulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. As shown in FIG. 2, the controller/processor 280 of the UE 120*a* has an RF exposure manager 281 that is representative of the RF exposure manager 122, according to aspects described herein. Although shown at the controller/processor, other components of the UE 120*a* and BS 110*a* may be used to perform the operations described herein.

NR may utilize OFDM with a cyclic prefix (CP) on the uplink and downlink. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120*a* is described with respect to FIGS. 1 and 2 as communicating with a BS and/or within a network, the UE 120*a* may be configured to communicate directly with/transmit directly to another UE 120, or with/to another wireless device without relaying communications through a network. In some aspects, the BS 110*a* illustrated in FIG. 2 and described above is an example of another UE 120.

Example RF Transceiver

Figure 3:
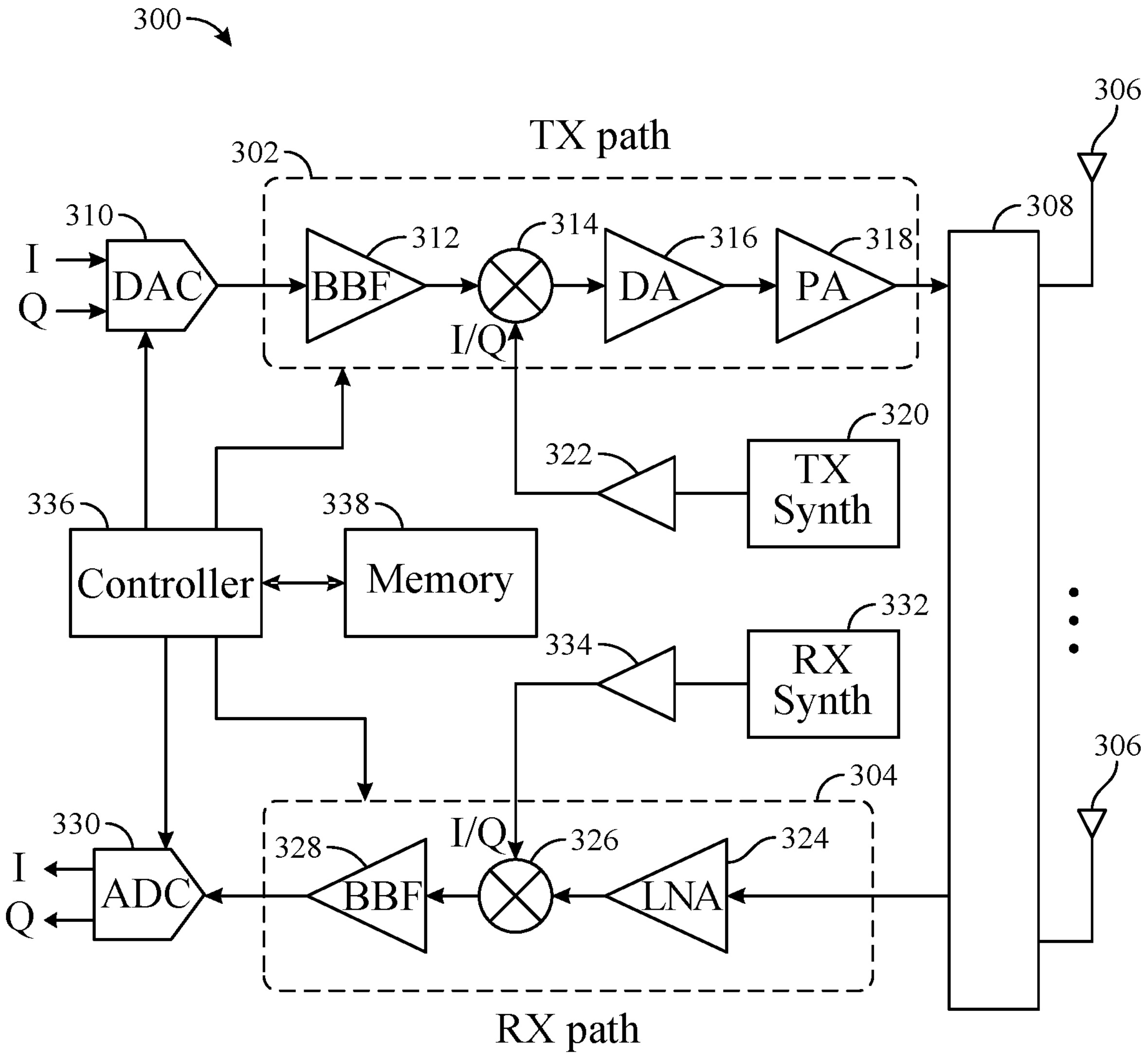
FIG. 3 is a block diagram of an example radio frequency (RF) transceiver.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO frequency with a particular tuning range. Thus, the transmit LO frequency may be produced by a TX frequency synthesizer 320, which may be buffered or amplified by amplifier 322 before being mixed with the baseband signals in the mixer 314. Similarly, the receive LO frequency may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power applied to the TX path 302 (e.g., certain levels of gain applied to the BBF 312, the DA 316, and/or the PA 318) that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of milliwatts per square centimeter ($mW/cm^2$). In certain cases, a maximum permissible exposure (MPE) limit in terms of PD may be imposed for wireless devices using transmission frequencies above 6 GHz. The MPE limit is a regulatory metric for exposure based on area, e.g., an energy density limit defined as a number, X, watts per square meter ($W/m^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHz range in some examples.

In certain cases, compliance with an RF exposure limit may be performed as a time-averaged RF exposure evaluation within a specified time window (T) (e.g., 2 seconds for mmWave or 60 GHz bands, 100 or 360 seconds for bands≤6 GHz, etc.) associated with the RF exposure limit.

Figure 4A:
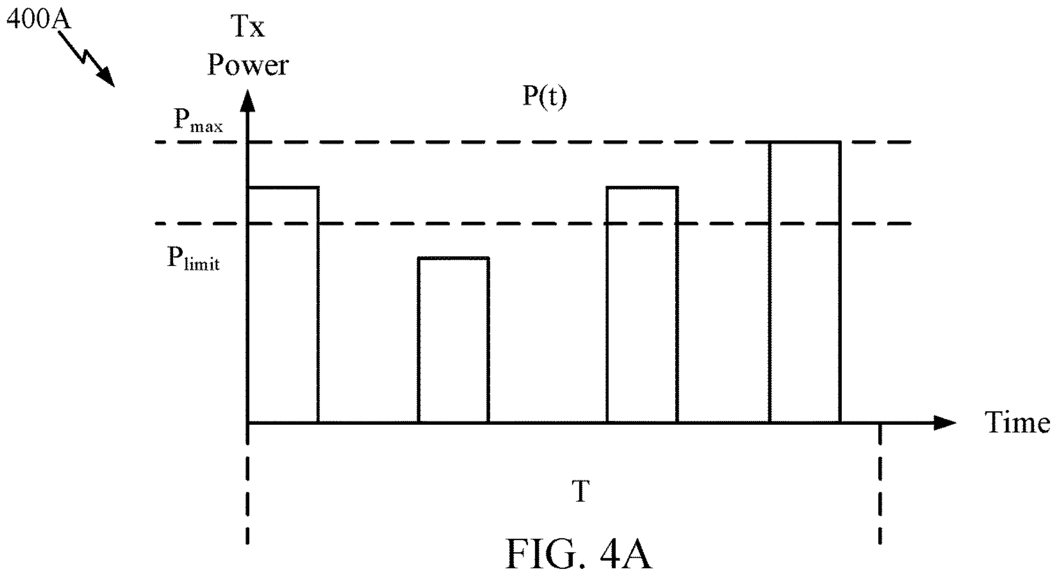
FIGS. 4A, 4B, and 4C are graphs illustrating examples of transmit powers over time in compliance with a time-averaged RF exposure limit.

FIG. 4A is a graph 400A of a transmit power over time (P(t)) that varies over a time window (T) associated with a time-averaged RF exposure limit, in accordance with certain aspects of the present disclosure. As an example, the instantaneous transmit power may exceed a maximum time-averaged transmit power level ($P_{limit}$) in certain transmission occasions in the time window (T). In some cases, the maximum time-averaged transmit power level may account for uncertainties with the transceiver circuitry, such as temperature drift, component age, etc. The transmit power may be greater than the maximum time-averaged transmit power level $P_{limit}$. In certain cases, the UE may transmit at $P_{max}$, which is the maximum transmit power supported by the UE. In some cases, the UE may transmit at a transmit power less than or equal to the maximum time-averaged transmit power level $P_{limit}$ in certain transmission occasions. The maximum time-averaged transmit power level $P_{limit}$ represents the time-averaged threshold in terms of transmit power for the RF exposure limit over the time window (T), and in certain cases, $P_{limit}$ may be referred to as the maximum time-averaged power level or limit, or in terms of exposure, the maximum time-averaged RF exposure level or limit. In some cases, the maximum time-averaged transmit power level $P_{limit}$ may correspond to a maximum allowable transmit power as described herein. The graph 400A also illustrates gaps between transmission bursts, where the gaps represent periods during which no transmission was output from the device.

Figure 4B:
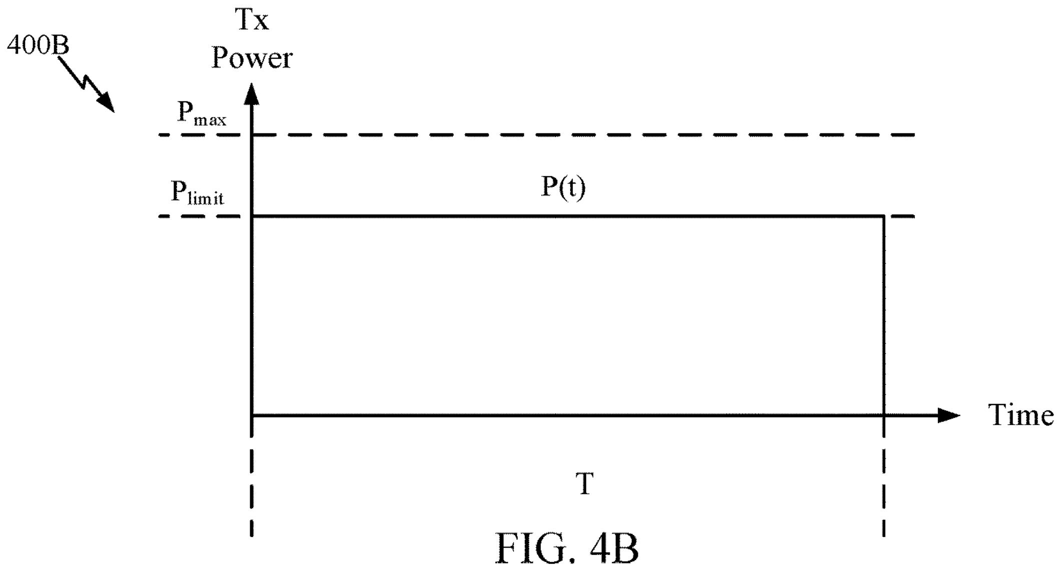

In certain cases, the transmit power may be maintained at the maximum time-averaged transmit power level (e.g., $P_{limit}$) allowed for RF exposure compliance that enables continuous transmission during the time window. For example, FIG. 4B is a graph 400B of a transmit power over time (P(t)) illustrating an example where the transmit power is limited to $P_{limit}$, in accordance with certain aspects of the present disclosure. As shown, the UE can transmit continuously at $P_{limit}$ in compliance with the RF exposure limit.

Figure 4C:
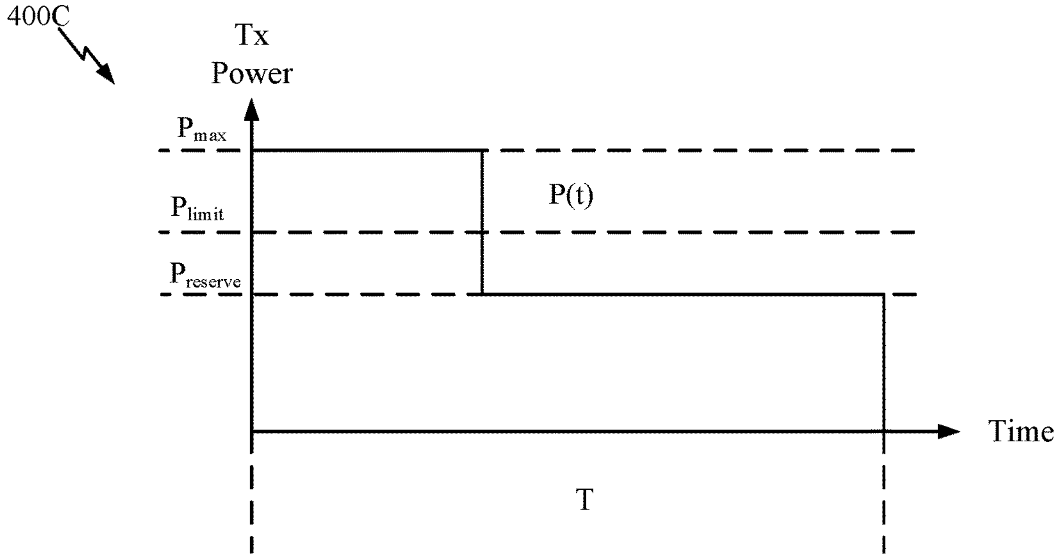

FIG. 4C is a graph 400C of a transmit power over time (P(t)) illustrating a time-averaged mode that provides a reserve power to enable a continuous transmission within the time window (T), in accordance with certain aspects of the present disclosure. As shown, the transmit power may be backed off from the maximum instantaneous power ($P_{max}$) to a reserve power (Preserve) so that the UE can continue transmitting at the lower power (Preserve) to maintain a continuous transmission during the time window (e.g., maintain a radio connection with a receiving entity). In FIG. 4C, the area between $P_{max}$ and Preserve for the time duration of $P_{max}$ may be equal to the area between $P_{limit}$ and Preserve for the time window T, such that the area of transmit power (P(t)) in FIG. 4C is equal to the area of $P_{limit}$ for the time window T. Such an area may be considered using 100% of the energy (transmit power or exposure) to remain compliant with the time-averaged RF exposure limit. Without the reserve power Preserve, the transmitter may transmit at $P_{max}$ for a portion of the time window with the transmitter turned off for the remainder of the time window to ensure compliance with the time-averaged RF exposure limit. In some aspects, Preserve is set at a fixed power used to serve for a purpose (e.g., reserving power for certain communications). The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

In some aspects, the UE may transmit at a power that is higher than the average power level, but less than $P_{max}$ in the time-averaged mode illustrated in FIG. 4C. While a single transmit burst is illustrated in FIG. 4C, it will be understood that the UE may instead utilize multiple transmit bursts within the time window (T), for example, as described herein with respect to FIG. 4A, where the transmit bursts may be separated by periods during which the transmit power is maintained at or below Preserve. Further, it will be understood that the transmit power of each transmit burst may vary (either within the burst and/or in comparison to other bursts), and that at least a portion of the burst may be transmitted at a power above the maximum average power level (e.g., $P_{limit}$).

While FIGS. 4A-4C illustrate continuous transmission over a window, occasion, burst, etc., it will be understood that a duty cycle for transmission may be implemented. In such implementations, a transmit power may be zero periodically and maintained at a higher level (e.g., a level as illustrated in FIGS. 4A-4C) during other portions of the duty cycle. As used herein, the duty cycle of the transmission may refer to a portion (e.g., 5 ms) of a specific period (e.g., 500 ms) in which one or more signals are transmitted. In certain cases, the duty cycle may be standardized (e.g., predetermined) with a specific RAT and/or vary over time, for example, due to changes in radio conditions, mobility, and/or user behavior.

In certain cases, a wireless communications device may evaluate RF exposure compliance using a maximum allowable transmit power ($P_{limit}$) corresponding to a time-averaged RF exposure limit. The maximum allowable transmit power may correspond to a transmit power that satisfies the time-averaged RF exposure limit assuming the wireless device is transmitting for the entire duration of the time window associated with the time-averaged RF exposure limit (e.g., 2 seconds for mmWave or 60 GHz bands, 100 or 360 seconds for bands≤6 GHz, etc.), for example, as depicted in FIG. 4B. To ensure compliance with the time-averaged RF exposure limit, the wireless device may allow transmit powers to be no greater than the maximum allowable transmit power. Such a scheme may facilitate a simplified RF exposure evaluation without having to determine a rolling average of the RF exposure for a given time window associated with the time-averaged RF exposure limit, and this scheme may be referred to as a non-averaging RF exposure evaluation.

In some cases, a wireless device may be equipped with multiple radios for wireless communications, such as code division multiple access (CDMA), an Evolved Universal Terrestrial Radio Access (E-UTRA), Fifth Generation New Radio (5G NR), IEEE 802.11, Bluetooth, Non-Terrestrial Network, etc. For example, some wireless devices may support multi-mode (e.g., E-UTRA and 5G NR, 5G NR and IEEE 802.11, etc.) and/or multi-band (e.g., sub-6 GHz bands and mmWave bands) communications via multiple transmit antennas (or radios) for simultaneous or concurrent transmissions. To ensure compliance with the RF exposure limit, the wireless device may limit the maximum combined instantaneous transmit power for the multi-mode/multi-band communications.

To account for the multi-radio communications, the wireless device may be configured with a maximum allowable transmit power per radio for each transmission scenario including multi-radio scenarios (e.g., a multi-mode/multi-band scenario), where a transmission scenario may correspond to one or more radios, one or more bands, one or more antennas, and/or one or more exposure scenarios (e.g., head exposure, extremity exposure, body exposure, or hot spot exposure) used for transmission(s) in a time interval. The wireless device may be configured with a look-up table of maximum allowable transmit powers per radio corresponding to various transmission scenarios, and the wireless device may use the specific value(s) of the maximum allowable transmit powers per radio from the look-up table depending on the transmission scenario. For multi-radio scenarios, the look-up table may have prelimited backoffs (or preadjusted $P_{limits}$) for each of the radios.

As an example, assuming the wireless device has two radios, the wireless device may have values for the maximum allowable transmit powers for the first radio and the second radio for the transmission scenario(s) when the radios are used concurrently or in the same time interval. The wireless device may have a value for the maximum allowable transmit power associated with the first radio for the transmission scenario when only the first radio is used, and the wireless device may have another value for the maximum allowable transmit power associated with the second radio for the transmission scenario when only the second radio is used. The wireless device may have maximum allowable transmit powers per radio for different bands, different antennas, and/or different exposure scenarios.

As the total transmit power that meets RF exposure limits can vary depending on the transmission scenario (e.g., band, antenna, exposure scenario, etc.), the wireless device may be configured with values for the maximum allowable transmit power per radio for multiple transmission scenarios. As the maximum allowable transmit powers per radio for each transmission scenario are determined under RF exposure testing, it will take time and other resources (e.g., testing equipment and/or simulation data) to perform the testing for each transmission scenario and populate the look-up table with the values of the maximum allowable transmit powers per radio. In addition, such a look-up table may use a certain amount of memory storage on the wireless device.

Example RF Exposure Management for Multiple Radios

Aspects of the present disclosure provide apparatus and methods for multi-radio RF exposure management, for example, without prepopulating a look-up table having separate power limits for radios in multi-radio scenarios. A wireless device may evaluate the RF exposure compliance sequentially per radio, such that the combined transmit powers determined for each radio in a different time interval among a sequence of time intervals complies with the RF exposure limit. For example, the wireless device may first determine one radio's RF exposure and corresponding transmit power associated with a first time interval (e.g., the one radio being a higher priority or primary radio), and any remaining available RF exposure can be used for another radio (e.g., a lower priority or secondary radio) in a second time interval following the first time interval. The wireless device may expand the sequential exposure evaluation to any number of radios. For example, a third time interval (which may be the same or different from the second time interval) may be used for a third radio (e.g., an even lower priority or tertiary radio), which can use the remaining exposure left over from the combined exposure of the first radio and the second radio. Unlike some prepopulated static look-up tables, the maximum allowable transmit power for a second, lower priority radio may not be prelimited based on the maximum allowable transmit power for a first, higher priority radio for a given transmission scenario and stored as a pair of allowable transmit powers in the look-up table for this scenario.

The apparatus and methods for multi-radio RF exposure management described herein may facilitate improved wireless communication performance (e.g., improved signal quality at the receiver, lower latencies, higher throughput, etc.) by potentially allowing for higher transmission power per radio compared to other solutions. For example, the multi-radio RF exposure management may allow the wireless device to evaluate RF exposure per time interval and distribute any remaining exposure to other radios. The multi-radio RF exposure management may allow the wireless device to select a high priority radio for prioritized allocation of exposure, which may improve the wireless communication performance for a particular radio, for example, for the high priority radio and/or other radios. The multi-radio RF exposure management may allow the wireless device to reduce the size of the look-up table of maximum allowable transmit powers. The multi-radio RF exposure management may allow the wireless device manufacturer to avoid performing exposure testing for multi-radio exposure scenarios and populating a complex look-up table as previously described herein. The wireless device may store a maximum allowable transmit power per radio for various transmission scenarios (e.g., band, antenna, exposure scenario, etc.) associated with a single radio, instead of various radio combinations (e.g., first radio only, second radio only, and/or a combination of the first radio and the second radio) with prepopulated static limits for each radio for a given transmission scenario.

Figure 5:
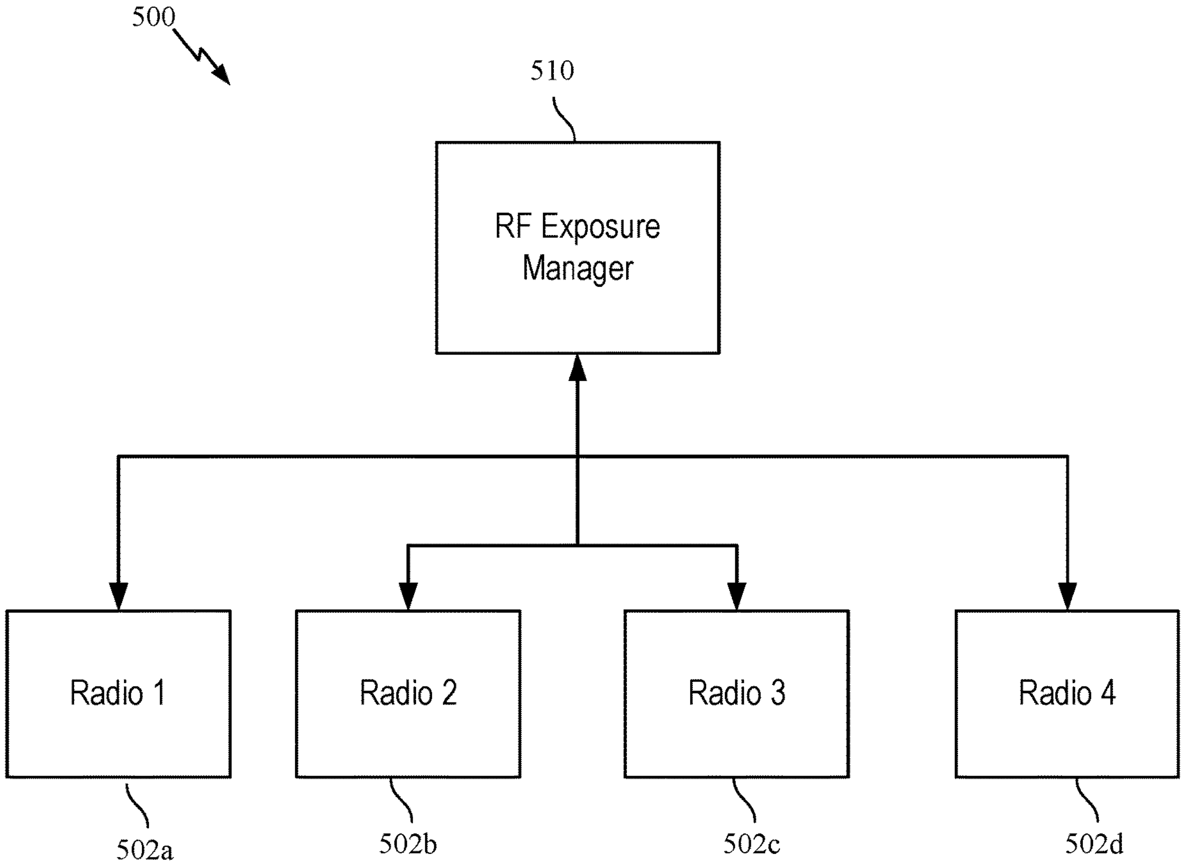
FIG. 5 is a diagram of an example processing architecture for allocating energy across multiple radios.

For certain aspects, the multi-radio RF exposure management may be performed using a centralized processing architecture, for example, at a modem (and/or processor) associated with one or more radios. FIG. 5 is a diagram of an example processing architecture 500 for allocating energy across multiple radios, in accordance with certain aspects of the present disclosure. For example, the radios 502*a-d* (e.g., Radio 1, Radio 2, etc.) of a wireless device may report past RF exposure usage (or production) to an RF exposure manager 510 (e.g., analogous to the RF exposure manager 122 of FIG. 1), and the RF exposure manager 510 may provide an allowable transmit power (e.g., a maximum allowable instantaneous transmit power) associated with a time interval to the radios 502*a-d* that will be transmitting in the time interval. The RF exposure manager 510 may determine the allowable transmit powers using the sequential exposure evaluation as further described herein.

It should be appreciated that the RF exposure manager 510 and/or radios depicted in the processing architecture 500 may be implemented in hardware, software, or a combination of both. For example, the RF exposure manager 510 and/or radios included in the processing architecture 500 may be implemented in a modem, an RF circuit (e.g., a transceiver), memory blocks, registers, processing blocks, and/or in instructions (e.g., software code or executable instructions). The executable instructions may be stored in memory and executed on a processor (e.g., an application processor and/or modem processor).

Figure 6A:
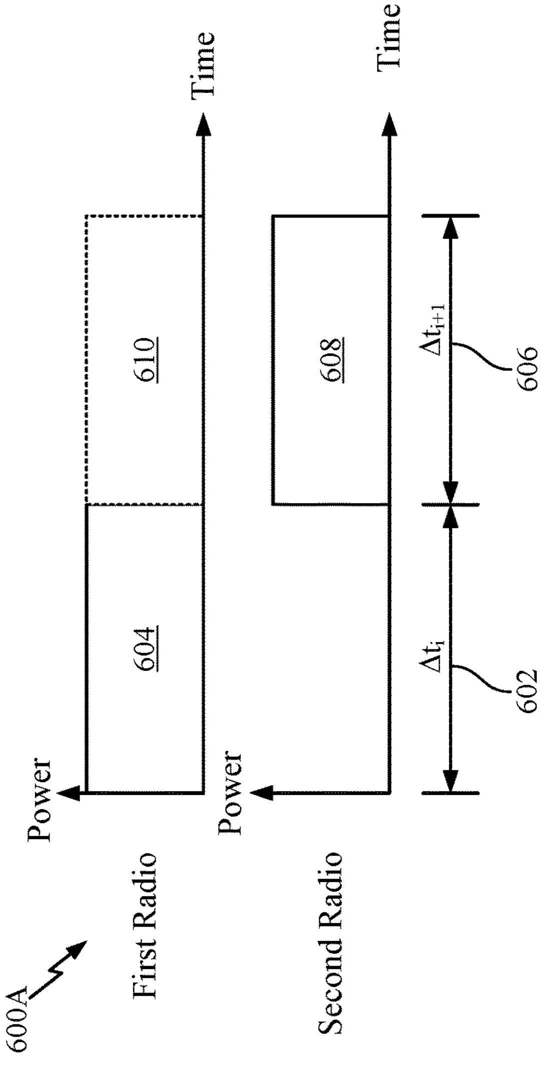
FIG. 6A is a timing diagram illustrating an example of RF exposure management for a wireless device with two radios, in accordance with certain aspects of the present disclosure.

FIG. 6A is a timing diagram 600A illustrating an example of RF exposure management for a wireless device (e.g., the UE 120) with two radios. In this example, the wireless device may have an RF exposure manager (e.g., RF exposure manager 510 in FIG. 5), a first radio (e.g., Radio 1 in FIG. 5), and a second radio (e.g., Radio 2 in FIG. 5), for example, as described herein with respect to FIG. 5. The radios may be (or expected to be) transmitting in the same time period such that the evaluation for RF exposure compliance accounts for the transmission activity of both radios. For example, the RF exposure manager may select the maximum allowable transmit power ($P_{limit}$) associated with the current transmission scenario (e.g., frequency band, antenna, exposure scenario, etc.) for the first radio, and the RF exposure manager may provide the $P_{limit}$ to the first radio, such as the RF circuitry associated with the first radio (e.g., the transceiver circuit 300). The RF exposure manager may select $P_{limit}$ from a look-up table comprising values for $P_{limit}$ associated with the first radio for various transmission scenarios as described herein. The first radio may transmit a signal at a transmit power 604 that is less than or equal to the corresponding $P_{limit}$ in a first time interval 602 ($\Delta t_i$) in compliance with the corresponding time-averaged RF exposure limit. The RF exposure manager may obtain, from the first radio, a transmit power report associated with the first radio for the first time interval 602. The transmit power report may include (or indicate) the transmit power(s) 604 used by the first radio in the first time interval 602. For example, the transmit power report may include the average transmit power used by the first radio in the first time interval 602.

The RF exposure manager may determine a maximum allowable instantaneous transmit power 608 associated with the second radio for a second time interval 606 ($\Delta t_{i+1}$), where the second time interval 606 is next to and follows the first time interval 602 in time. In some cases, the second time interval 606 may follow the first time interval 602 in time without being next to the first time interval 602. When the RF exposure manager is determining the maximum allowable instantaneous transmit power 608, the second time interval 606 may be a future time interval. The first time interval 602 and the second time interval 606 may be in a sequence of time intervals, such that the first time interval 602 and the second time interval 606 are consecutive time intervals in the sequence. To determine the maximum allowable instantaneous transmit power 608 for the second radio, the RF exposure manager may determine the normalized exposure associated with the first radio for the first time interval 602. The normalized exposure associated with the first radio (norm.exposure.first) may be determined according to the following expression:

$$norm.exposure.first = \left[\frac{\text{power\_report\_first}}{P_{limit\_first}}\right] \quad (1)$$

where power_report_first may be the average transmit power used in the first time interval 602 by the first radio (e.g., in milliwatts (mW)) and $P_{limit\_first}$ is the maximum allowable transmit power associated with the first radio in the first time interval 602 (e.g., in mW). That is, the normalized exposure associated with the first radio may be equal to transmit power used in the first time interval 602 by the first radio divided by the maximum allowable transmit power associated with the first radio.

The RF exposure manager may determine an exposure margin associated with the second radio (norm.exposure.margin.sec) based on the normalized exposure associated with the first radio, where the exposure margin is the remaining exposure available to the second radio. The exposure margin may be determined according to the following expression:

$$norm.exposure.margin.sec = [1 - norm.exposure.first] \quad (2)$$

That is, as a normalized value (to $P_{limit}$), the exposure margin associated with the second radio may be equal to the difference of one and the normalized exposure associated with the first radio as determined from Expression (1).

The RF exposure manager may determine the maximum allowable instantaneous transmit power associated with the second radio (MAIP_sec) based on the exposure margin. For example, the maximum allowable instantaneous transmit power associated with the second radio may be determined according to the following expression:

$$\text{MAIP\_sec} = norm.exposure.margin.sec * P_{limit\_sec} \quad (3)$$

where $P_{limit}$ sec is the maximum allowable transmit power associated with the second radio for the current transmit scenario (e.g., frequency band, antenna, exposure scenario, etc.). That is, the maximum allowable instantaneous transmit power associated with the second radio may be equal to the product of the exposure margin and the maximum allowable transmit power ($P_{limit}$) associated with the second radio.

The RF exposure manager may provide the maximum allowable instantaneous transmit power determined for the second time interval to the RF circuitry (e.g., a transceiver circuit) associated with the second radio. The sum of the normalized exposure associated with the first radio in the first time interval 602 and the normalized exposure associated with the second radio in the second time interval 606 satisfies an RF exposure limit (e.g., a normalized limit of one). For example, the sum of the normalized exposures for the first radio and the second radio may be less than a normalized limit (e.g., one). In some cases, a reserve may be maintained for the second radio or one or more other radio(s), such as a third radio, as further described herein. In certain cases, the wireless device may transmit another signal at a transmit power 610 in the second time interval 606 using the first radio. Such a transmission may be used to determine the transmit power for the second radio in the next time interval (not shown), for example, as described herein with respect to FIG. 6B.

In certain aspects, the RF exposure manager may determine the maximum allowable instantaneous transmit power based on a duty cycle associated with the radio. The duty cycle may be indicative of the maximum amount of time a radio is expected to transmit in a time period. In some cases, the duty cycle may be configured according to a particular radio access technology, such as a time division duplex (TDD) uplink-downlink pattern associated with Global System for Mobile Communications (GSM), LTE, and/or NR. As an example, for the first time interval 602, the RF exposure manager may determine the maximum allowable instantaneous transmit power associated with the first radio (MAIP_first) according to the following expression:

$$\text{MAIP\_first} = P_{limit\_first} / \text{duty\_cycle} \quad (4a)$$

where duty_cycle is representative of the duty cycle associated with the first radio for the first time interval. For the second time interval 606, the RF exposure manager may determine the maximum allowable instantaneous transmit power (MAIP_sec) for the second radio according to the following expression:

$$\text{MAIP\_sec} = norm.exposure.margin.sec * P_{limit\_sec} / \text{duty\_cycle} \quad (4b)$$

where duty_cycle is representative of the duty cycle associated with the second radio for the second time interval.

The RF exposure management described herein may allow the wireless device to store a maximum allowable transmit power ($P_{limit}$) for various transmission scenarios per radio (e.g., frequency band, antenna, exposure scenario, etc.), for example, without multi-radio combinations having prelimited transmit powers per radio. The RF exposure management described may allow the wireless device to take into account the actual transmit power used by a priority radio to determine the maximum allowable instantaneous transmit power associated with a secondary radio. The RF exposure management described herein may be applied alongside a time-averaged implementation for RF exposure compliance, for example, as described herein with respect to FIGS. 4A-4C. For example, the wireless device may switch between performing the RF exposure management described herein and applying a time-averaged implementation. The time-averaged implementation may include the wireless device determining the maximum allowable transmit power for a future time interval that satisfies a time-averaged RF exposure limit (e.g., $P_{limit}$) based on past transmit power(s) in a time window associated with the RF exposure limit.

In certain aspects, the wireless device may have antennas arranged into antenna groups, where an antenna group may include one or more antennas (or antenna modules) associated with one or more radios. The antenna groups may be configured and/or operated so as to be mutually exclusive of each other in terms of RF exposure. That is, the RF exposure produced by one antenna group may not contribute to the RF exposure produced by another antenna group, for example, due to the antenna groups being arranged in different locations of the wireless device. The RF exposure compliance and corresponding transmit power levels may be determined separately for each antenna group allowing for multiple antenna groups to transmit in the same time period. The RF exposure compliance for the antenna groups may be conducted in parallel (e.g., concurrently together). In some cases, the wireless device may perform the multi-radio RF exposure management described herein with respect to an antenna group. The wireless device may store maximum allowable transmit powers associated with the radios per antenna group, and the wireless device may evaluate the RF exposure compliance for multiple radios per antenna group. For example, in the case of transmissions involving antennas from different antenna groups in the same time period, the radios associated with the antenna groups may transmit up to the respective maximum allowable transmit powers (e.g., $P_{limit}$) as described herein.

As the multi-radio RF exposure management described herein uses normalized exposures and normalized energy allocations, the wireless device may evaluate RF exposure compliance across various frequency bands with different RF exposure limits, such as sub-6 GHz bands and/or mmWave bands. As an example, the first radio may be configured to transmit signals in sub-6 GHz bands, and the second radio may be configured to transmit signals in mmWave bands.

In certain aspects, the RF exposure manager may select the first radio among multiple radios (e.g., Radio 1 through Radio 4 in FIG. 5) having transmissions to output in the first time interval 602. For example, the RF exposure manager may identify that the first radio has priority over the other radios to be allocated energy for the first time interval 602. The priorities associated with the radios may be based on one or more criteria, such as a duty cycle, a frequency band, a quality of service (QOS) characteristic (e.g., latency, data rate, priority level, etc.), and a service type (e.g., URLLC, eMBB, Internet-of-Things (IOT), voice traffic, video traffic, interactive gaming, mission critical data, etc.), as illustrative, non-limiting examples.

Figure 6B:
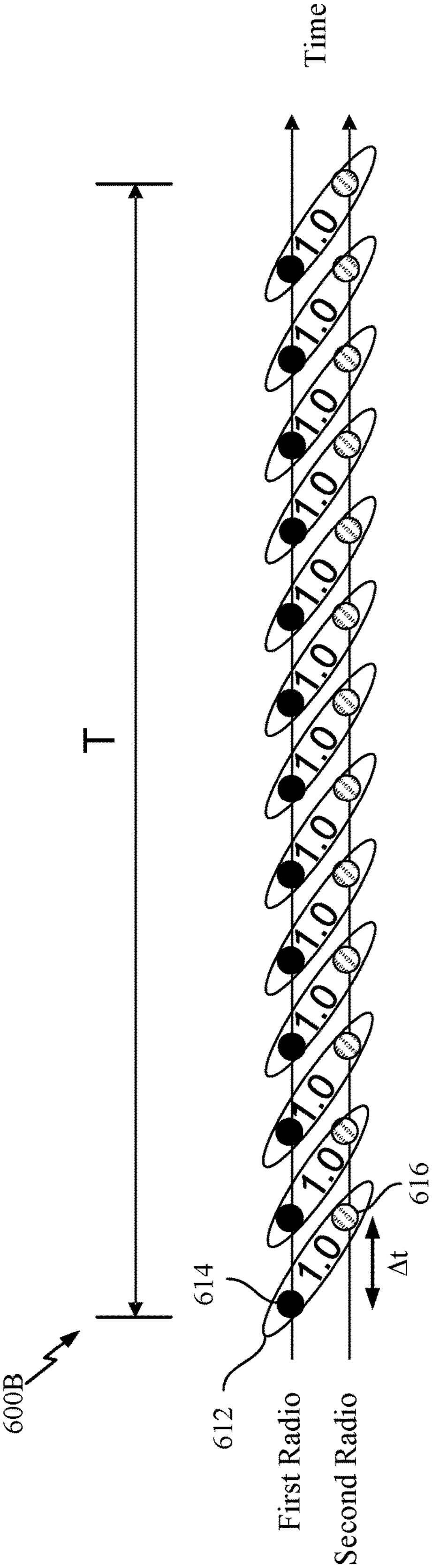
FIG. 6B is a timing diagram illustrating the example of RF exposure management depicted in FIG. 6A performed across a time window (T) associated with a time-averaged RF exposure limit, in accordance with certain aspects of the present disclosure.

FIG. 6B is a timing diagram 600B illustrating the example of RF exposure management depicted in FIG. 6A performed across a time window (T) associated with a time-averaged RF exposure limit. In this example, the RF exposure manager determines the maximum allowable exposure for the second radio in a future time interval (e.g., the second time interval 606) based on the past exposure of the first radio in a past time interval (e.g., the first time interval 602). The sum of normalized exposures of the first radio and the second radio may satisfy an RF exposure limit (e.g., a normalized limit of one). For example, a set of normalized exposures 612 including a first exposure 614 associated with the first radio and a second exposure 616 associated with the second radio may satisfy the RF exposure limit. Each of the normalized exposures may correspond to a different time interval in a sequence of time intervals (e.g., the first time interval 602 and the second time interval 606). The RF exposure manager may continue performing the RF exposure evaluation for the second radio in a future time interval based on the transmitted power of the first radio in a past interval. The RF exposure manager may determine the maximum allowable instantaneous transmit power associated with the second radio for the future time interval based on the past exposure produced by the first radio in the past time interval. Assuming the duration of the time intervals (e.g., Δt) for the first radio and the second radio is much less than the time window (T) associated with the time-averaged RF exposure limit, the resulting average total exposure across the time window will comply with the time-averaged RF exposure limit. For example, each of the first time interval 602 and the second time interval 606 may be a portion of the time window (T) associated with the time-averaged RF exposure limit.

In certain aspects, the multi-radio RF exposure management described herein may be applied to more than two radios transmitting in the same time period. For example, the exposure margin left by a first radio may be used for a second radio, and the remaining exposure margin may be used for a third radio.

Note that, in some cases, the durations of the time intervals (e.g., Δt) for the first radio and the second radio (or, in general, any radio of the wireless device) may be less than a regulatory time window. The regulatory time window, for example, may be a time window (T) associated with an RF exposure limit, such as a time-averaged RF exposure limit. In general, the multi-radio RF exposure management described herein may implement time intervals with any applicable duration.

Figure 7A:
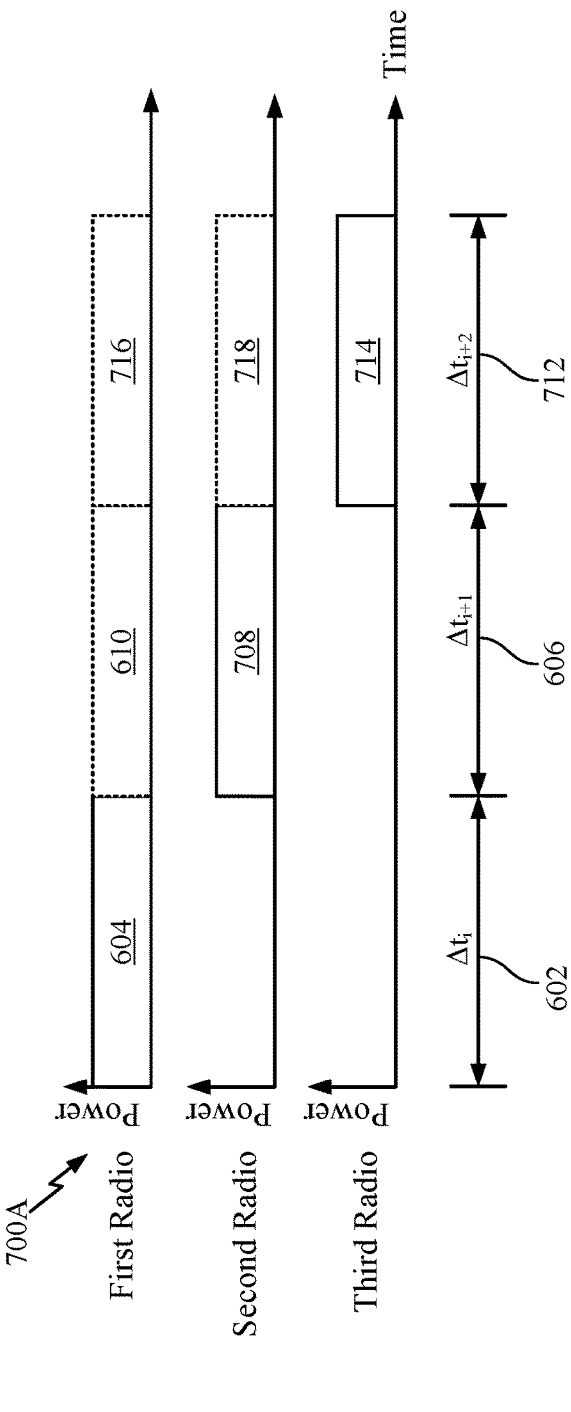
FIG. 7A is a timing diagram illustrating an example of RF exposure management for a wireless device with three radios, in accordance with certain aspects of the present disclosure.

FIG. 7A is a timing diagram 700A illustrating an example of RF exposure management for a wireless device (e.g., the UE 120) with three radios. In this example, the wireless device may have an RF exposure manager (e.g., RF exposure manager 510 in FIG. 5), a first radio (e.g., Radio 1 in FIG. 5), a second radio (e.g., Radio 2 in FIG. 5), and a third radio (e.g., Radio 3 in FIG. 5), for example, as described herein with respect to FIG. 5. The RF exposure manager may perform the same operations for the first radio and the second radio as described herein with respect to FIG. 6A. In this example, the second time interval 606 ($\Delta t_{i+1}$) may be a past time interval when the RF exposure manager is determining a maximum allowable instantaneous transmit power 714 for the third radio in a third time interval 712 ($\Delta t_{i+2}$), which is next to and follows the second time interval 606 in time. In some cases, the third time interval 712 may follow the second time interval 606 in time without being next to the second time interval 606. The second radio may transmit a signal at a transmit power 708 that is less than or equal to the corresponding maximum allowable instantaneous transmit power in the second time interval 606 ($\Delta t_{i+1}$) in compliance with the corresponding time-averaged RF exposure limit. The RF exposure manager may obtain, from the second radio, a transmit power report associated with the second radio for the second time interval 606. The transmit power report may include or indicate the transmit power(s) 708 (e.g., an average transmit power) used by the second radio in the second time interval 606.

The RF exposure manager may determine the maximum allowable instantaneous transmit power associated with the third radio for the third time interval 712 based on the remaining exposure margin and the past exposure used by the second radio in the second time interval 606. The RF exposure manager may determine an exposure margin associated with the third radio (norm.exposure.margin.third), for example, according to the following expression:

$$norm.exposure.margin.third = \left[norm.exposure.margin.sec - \frac{\text{power\_report\_sec}}{P_{limit\_sec}}\right] \quad (5)$$

where norm.exposure.margin.sec may be determined according to Expression (2), for example; and power_report_sec may be the average transmit power used in the second time interval 606 by the second radio. That is, as a normalized value (to $P_{limit}$), the exposure margin associated with the third radio may be equal to the difference of the exposure margin associated with the second radio and the normalized exposure produced by the second radio in the second time interval 606.

The RF exposure manager may determine the maximum allowable instantaneous transmit power 714 associated with the third radio based on the exposure margin. For example, the maximum allowable instantaneous transmit power associated with the third radio (MAIP_third) may be determined according to the following expression:

$$\text{MAIP\_third} = norm.exposure.margin.third * P_{limit\_third} \quad (6)$$

where $P_{limit\_third}$ is the maximum allowable transmit power associated with the third radio for the current transmit scenario (e.g., frequency band, antenna, exposure scenario, etc.). That is, the maximum allowable instantaneous transmit power associated with the third radio may be equal to the product of the remaining exposure margin available and the maximum allowable transmit power ($P_{limit}$) associated with the third radio. Here too, the RF exposure manager may take into account the duty cycle associated with the third radio. For example, the maximum allowable instantaneous transmit power associated with the third radio (MAIP_third) may be determined according to the following expression:

$$\text{MAIP\_third} = norm.exposure.margin.third * P_{limit\_third} / \text{duty\_cycle} \quad (7)$$

where duty_cycle is representative of the duty cycle associated with the third radio for the third time interval 712.

The RF exposure manager may provide the maximum allowable instantaneous transmit power determined for the third time interval to the RF circuitry (e.g., a transceiver circuit) associated with the third radio. The sum of the normalized exposure associated with the first radio in the first time interval 602, the normalized exposure associated with the second radio in the second time interval 606, and the normalized exposure associated with the third radio in the third time interval 712 satisfies an RF exposure limit (e.g., a normalized limit of one). For example, the sum of the normalized exposures for the first radio, the second radio, and the third radio may be less than a normalized limit (e.g., one). In certain cases, the wireless device may transmit a signal at a transmit power 716 using the first radio and another signal at a transmit power 718 using the second radio in the third time interval 712. Such transmissions may be used to determine the transmit power for the third radio in a future time interval (not shown), for example, as described herein with respect to FIG. 7B.

Figure 7B:
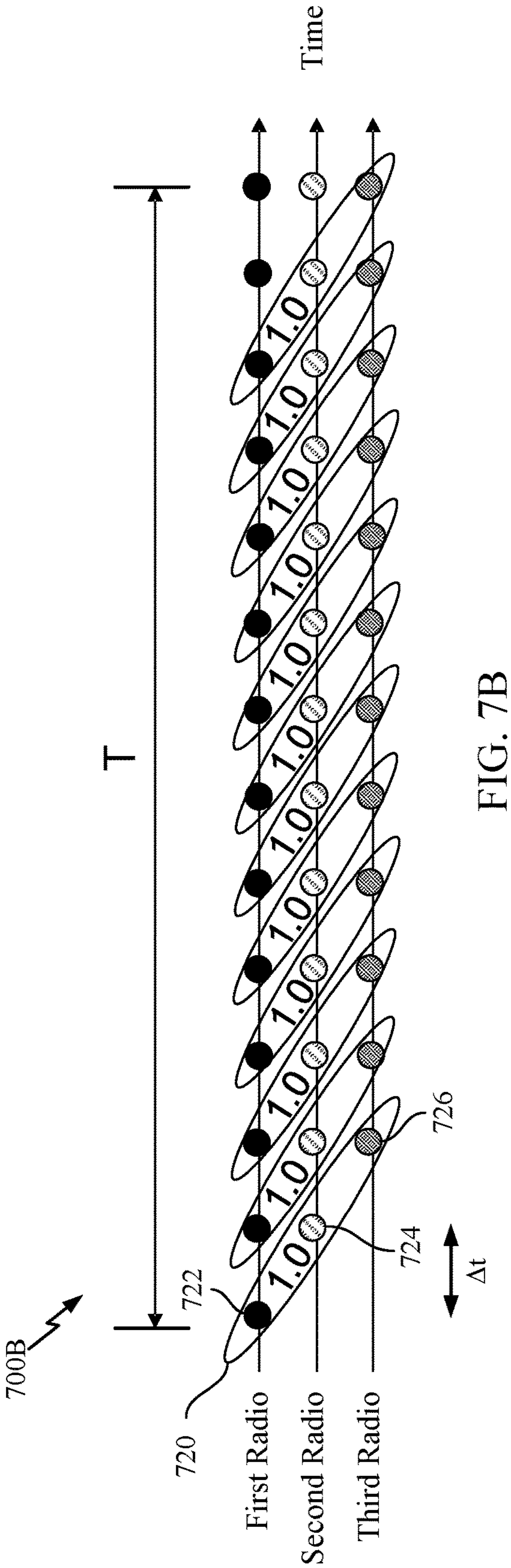
FIG. 7B is a timing diagram illustrating the example of RF exposure management depicted in FIG. 7A performed across the time window (T) associated with a time-averaged RF exposure limit, in accordance with certain aspects of the present disclosure.

FIG. 7B is a timing diagram 700B illustrating the example of RF exposure management depicted in FIG. 7A performed across the time window (T) associated with a time-averaged RF exposure limit. In this example, the RF exposure manager determines the maximum allowable exposure for the third radio in a future time interval (e.g., the third time interval 712) based on the past exposures of the first radio and the second radio in the respective past time intervals (e.g., the first time interval 602 and the second time interval 606). The sum of normalized exposures of the first radio, the second radio, and the third radio may satisfy an RF exposure limit (e.g., a normalized limit of one). For example, a set of normalized exposures 720 including a first exposure 722 associated with the first radio, a second exposure 724 associated with the second radio, and a third exposure 726 associated with the third radio may satisfy the RF exposure limit, where each of the normalized exposures corresponds to a different time interval in a sequence of time intervals (e.g., the first time interval 602, the second time interval 606, and the third time interval 712). The RF exposure manager may continue performing the RF exposure evaluation for the radios as described herein with respect to FIG. 7A.

The transmit power available for low priority radio(s) is based on exposure margin left by high priority radio(s). In the event a high priority radio transmits at its $P_{limit}$, the low priority radio(s) will have no margin available to transmit a signal. As a radio may be allowed to consume all of the exposure margin in the operations described herein with respect to FIGS. 6A and 7A, the wireless device may reserve a certain amount of energy for some radios, for example, the second radio with respect to FIG. 6A or the second radio and/or the third radio with respect to FIG. 7A. To avoid dropping a link for low priority radio(s), the transmit power of high priority radio(s) may be less than or equal to a certain percentage (x) of $P_{limit}$.

In a two-radio example, the first radio may be allowed to have a transmit power no more than a product of x and $P_{limit}$ (x·Plimit_first), where x is less than 1.0, so that the second radio is guaranteed to have at least (1−x) of margin. In certain aspects, the RF exposure manager may take into account the duty cycle associated with the first radio. For example, the RF exposure manager may determine the maximum allowable instantaneous transmit power associated with the first radio (MAIP_first) as a product of x and $P_{limit}$ divided by the duty cycle (e.g., x*Plimit_pri/duty_cycle). The RF exposure manager may determine the normalized exposure associated with the first radio as provided in Expression (1). The RF exposure manager may determine any leftover exposure margin for the second radio (first.leftover) according to the following expression:

$$first.leftover = [x - norm.exposure.first] \quad (8)$$

where x is the reserve or power limit associated with the first radio. That is, the leftover exposure margin for the second radio may be equal to the difference of the reserve and the exposure margin. The RF exposure manager may determine the exposure margin associated with the second radio according to the following expression:

$$norm.exposure.margin.sec = [(1 - x) + first.leftover] \quad (9)$$

The RF exposure manager may determine the maximum allowable instantaneous transmit power associated with the second radio (MAIP_sec) based on the corresponding exposure margin, for example, according to Expression (3), and in some cases, based on the duty cycle, for example, according to Expression (4b). In certain aspects, the RF exposure manager may not take into account leftover exposure margin. The RF exposure manager may apply a predetermined allocation for each of the radios, e.g., allocate a normalized exposure margin of x (e.g., 70%) for the first radio and (1−x) (e.g., 30%) for the second radio.

In certain aspects, a reserve may be applied to additional radios. In a three-radio example, a first reserve (x) may represent the maximum energy that may be assigned to the first radio, and a second reserve (y) may represent the maximum energy that may be assigned to the second radio, where the remaining exposure margin is reserved for the third radio (e.g., 1.0−x−y), the sum of the first reserve and the second reserve being less than one (x+y<1.0). As an example, the RF exposure manager may determine the exposure margin associated with the second radio according to Expression (9). In some cases, the RF exposure manager may determine the exposure margin associated with the second radio based on the second reserve (y):

$$norm.exposure.margin.sec = [y + first.leftover] \quad (10)$$

The RF exposure manager may determine the maximum allowable instantaneous transmit power associated with the second radio (MAIP_sec) based on the corresponding exposure margin, for example, according to Expression (3), and in some cases, based on the duty cycle, for example, according to Expression (4b).

The RF exposure manager may determine the normalized exposure produced by the second radio in a time interval (e.g., the second time interval 606) according to the following expression:

$$norm.exposure.sec = \left[\frac{\text{power\_report\_sec}}{P_{limit\_sec}}\right] \quad (11)$$

The RF exposure manager may determine any leftover margin for the third radio (sec. leftover) according to the following expression:

$$sec.leftover = [norm.exposure.margin.sec - norm.exposure.sec] \quad (12)$$

where norm.exposure.margin.sec may represent the exposure margin associated with the second radio as determined according to Expression (9). That is, the leftover margin for the third radio may be equal to the difference of the exposure margin associated with the second radio and the exposure produced by the second radio. The RF exposure manager may determine the exposure margin associated with the third radio according to the following expression:

$$norm.exposure.margin.third = [(1 - x - y) + sec.leftover] \quad (13)$$

where y is the reserve or power limit associated with the second radio. The RF exposure manager may determine the maximum allowable instantaneous transmit power associated with the third radio based on the corresponding exposure margin, for example, according to Expression (6). In some cases, the maximum allowable instantaneous transmit power associated with the third radio (MAIP_third) may be determined based on the duty cycle associated with the third radio, for example, according to Expression (7). In certain aspects, the RF exposure manager may not take into account leftover exposure margins. The RF exposure manager may apply a pre-determined allocation to each of the radios, e.g., allocate a normalized exposure margin of x for the first radio, y for the second radio, and (1−x−y) for the third radio.

As an example of an allocation among N active radios, the wireless device may allocate a portion of the exposure margin among the first N−1 radios, and the remainder may be allocated to the $N^{th}$ radio. In this example, $x_1$ to $x_{N-1}$ represent the minimum percent of exposure allocation for the first N−1 radios, and the $N^{th}$ radio gets the remainder (e.g., $1-(x_1+x_2+ \ldots +x_{N-1})$), where the sum of the allocations to the first N−1 radios may be less than one (e.g., $x_1+x_2+ \ldots +x_{N-1}<1.0$). For each of the radios, the exposure associated with a given radio and the remaining exposure margin for the other radios may be determined after the respective radio transmits for a time interval (e.g., Δt or the first time interval 602).

For the first radio (Radio 1), the wireless device may determine the exposure margin according to the following expression:

$$norm.exposure.margin.radio1 = [x1 + \text{zero leftover}]$$

For the first radio, the wireless device may determine the maximum allowable instantaneous transmit power (MAIP_radio1) according to the following expression:

$$\text{MAIP\_radio1} = norm.exposure.margin.radio1 * \text{Plimit\_radio1} / \text{duty\_cycle1}$$

For the first radio, the wireless device may determine the RF exposure produced by the first radio as follows:

$$norm.exposure.radio1 = \text{power\_report\_radio1} / \text{Plimit\_radio1}$$

For the first radio, the wireless device may determine the leftover exposure for other radios as follows:

$$radio1.leftover = [norm.exposure.margin.radio1 - norm.exposure.radio1]$$

For the second radio (Radio 2), the wireless device may determine the exposure margin according to the following expression:

$$norm.exposure.margin.radio2 = [x2 + radio1.leftover]$$

For the second radio, the wireless device may determine the maximum allowable instantaneous transmit power (MAIP_radio2) according to the following expression:

$$\text{MAIP\_radio2} = \text{norm.exposure.margin.radio2} * P_{limit}\text{\_radio2} / \text{duty\_cycle2}$$

For the second radio, the wireless device may determine the RF exposure produced by the first radio as follows:

$$norm.exposure.radio2 = \text{power\_report\_radio2} / \text{Plimit\_radio2}$$

For the second radio, the wireless device may determine the leftover exposure for other radios as follows:

$$radio2.leftover = [norm.exposure.margin.radio2 - norm.exposure.radio2]$$

For the (N−1)$^{th}$ radio, the wireless device may determine the exposure margin according to the following expression:

$$norm.exposure.margin.radio_{N-1} = [x_{n-1} + radio(N-2).leftover]$$

For the (N−1)$^{th}$ radio, the wireless device may determine the maximum allowable instantaneous transmit power (MAIP_radio$_{N-1}$) according to the following expression:

$$\text{MAIP\_radio}_{N-1} = norm.exposure.margin.radio_{N-1} * \text{Plimit\_radio}_{N-1} / \text{duty\_cycle}_{N-1}$$

For the (N−1)$^{th}$ radio, the wireless device may determine the RF exposure produced by the first radio as follows:

$$norm.exposure.radio_{N-1} = \text{power\_report\_radio}_{N-1} / \text{Plimit\_radio}_{N-1}$$

For the (N−1)$^{th}$ radio, the wireless device may determine the leftover exposure for other radios as follows:

$$radio_{N-1}.leftover = [norm.exposure.margin.radio_{N-1} - norm.exposure.radio_{N-1}]$$

For the N$^{th}$ radio, the wireless device may determine the remaining exposure margin as follows:

$$norm.exposure.margin.radioN = [(1 - x1 - x2 - \ldots - x_{N-1}) + radio_{N-1}.leftover]$$

For the N$^{th}$ radio, the wireless device may determine the maximum allowable instantaneous transmit power (MAIP_radioN) as follows:

$$\text{MAIP\_radio}N = \text{norm.exposure.margin.radio}N * P\text{limit\_radio}N / \text{duty\_cycle}N$$

In certain aspects, the RF exposure manager may not take into account leftover exposure margins. The RF exposure manager may apply a predetermined allocation for each of the radios, e.g., allocate a normalized exposure margin of x1 for the first radio, x2 for the second radio, and so on, and $x_{N-1}$ for the (N−1)$^{th}$ radio, and (1−x1−x2− . . . —$x_{N-1}$) for the N$^{th}$ radio.

In certain aspects, the RF exposure manager may split the exposure margin associated with the second radio (norm-.exposure.margin.sec) among the second radio and any other radios (e.g., the third radio) instead of determining a separate exposure margin for the third radio according to Expression (13). In general, for an N-radio scenario, the total exposure margin may be allocated among the radios without considering any leftover margin or based on leftover margin, for example, as described herein according to Expressions (8)-(13).

Note that, in some cases, the durations of the time intervals (e.g., Δt) for the first radio, the second radio, and the third radio (or, in general, any radio of the wireless device) may be less than a regulatory time window. The regulatory time window, for example, may be a time window (T) associated with an RF exposure limit, such as a time-averaged RF exposure limit. In general, the multi-radio RF exposure management described herein may implement time intervals with any applicable duration.

Figure 8:
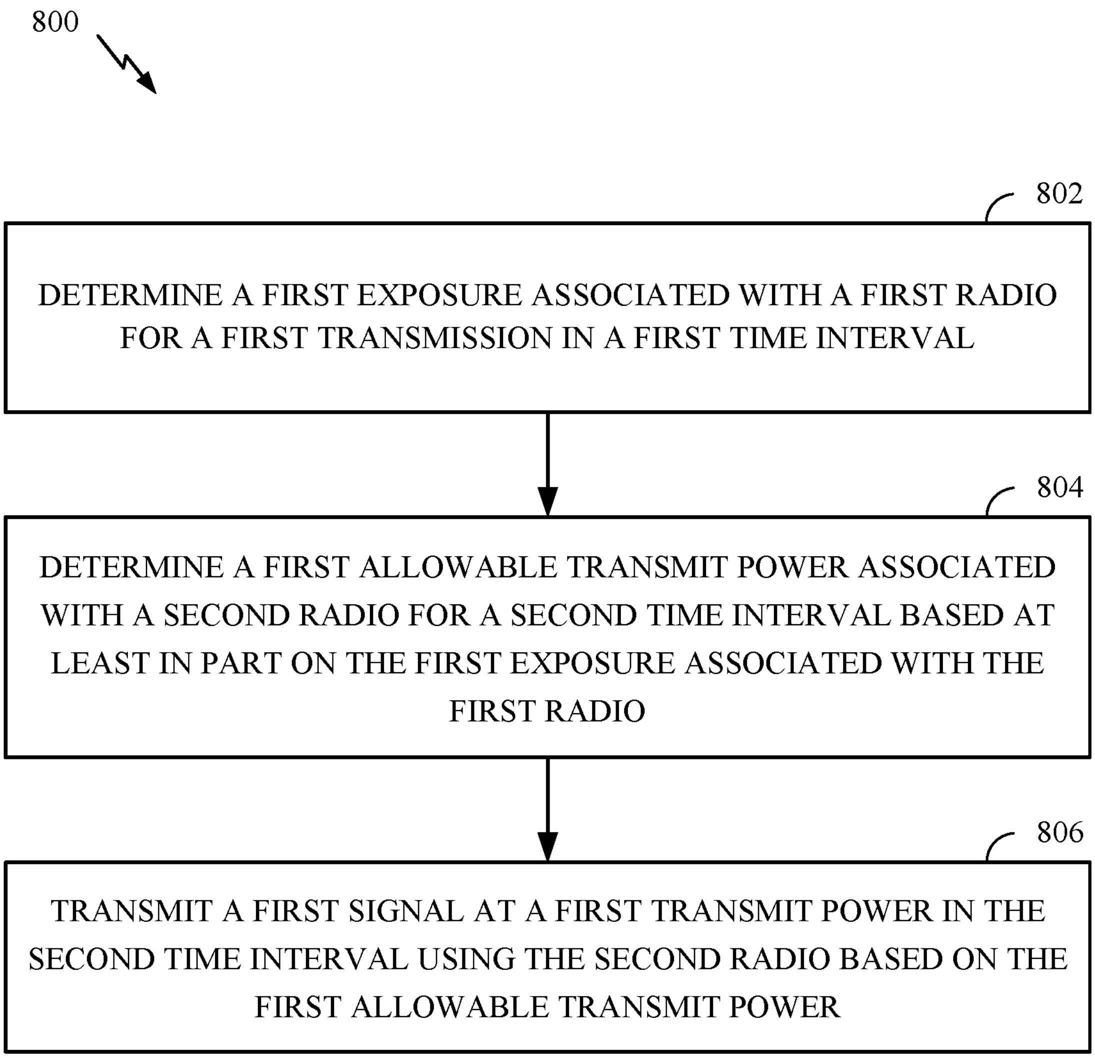
FIG. 8 is a flow diagram illustrating example operations for wireless communication by a wireless device, in accordance with certain aspects of the present disclosure.

FIG. 8 is a flow diagram illustrating example operations 800 for wireless communication, in accordance with certain aspects of the present disclosure. The operations 800 may be performed, for example, by a wireless device (e.g., the UE 120*a* in the wireless communication network 100). The operations 800 may be implemented as software components that are executed and run on one or more processors (e.g., controller/processor 280 of FIG. 2). Further, the transmission and/or reception of signals by the wireless device in the operations 800 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 800 may optionally begin, at block 802, where the wireless device may determine a first exposure associated with a first radio for a first transmission in a first time interval (e.g., the first time interval 602). For example, the wireless device may determine a normalized exposure associated with the first radio according to Expression (1) as described herein with respect to FIG. 6A. In certain aspects, the wireless device may determine the first exposure based at least in part on a first maximum time-averaged transmit power level ($P_{limit}$ first) associated with the first radio.

At block 804, the wireless device may determine a first allowable transmit power associated with a second radio for a second time interval (e.g., the second time interval 606) based at least in part on the first exposure associated with the first radio. For example, the wireless device may determine a maximum allowable instantaneous transmit power associated with the second radio according to Expression (3) or (4b) as described herein with respect to FIG. 6A. In certain aspects, the wireless device may determine the first allowable transmit power further based on a second maximum time-averaged transmit power level ($P_{limit}$ sec) associated with the second radio. The second time interval may be next to the first time interval in time.

At block 806, the wireless device may transmit a first signal at a first transmit power in the second time interval using the second radio based on the first allowable transmit power. The first transmit power may be less than or equal to the first allowable transmit power determined at block 804. In certain cases, the wireless device may transmit a second signal at a second transmit power in the second time interval using the first radio. The second transmit power may be less than or equal to a second allowable transmit power. The second allowable transmit power (e.g., MAIP_first) may be determined based at least in part on an exposure margin allocated to the first radio and a first maximum time-averaged transmit power level associated with the first radio. The exposure margin allocated to the first radio may be one.

In some cases, the wireless device may determine the maximum allowable instantaneous transmit power associated with the first radio based on a duty cycle associated with the first radio, for example, according to Expression (4a).

In certain aspects, the first allowable transmit power associated with the second radio may be based on an exposure margin. To determine the first allowable transmit power, the wireless device may determine a first exposure margin associated with the second radio based on the first exposure associated with the first radio, for example, according to Expression (2). The wireless device may determine the first allowable transmit power based on the first exposure margin and a second maximum time-averaged transmit power level (e.g., $P_{limit\_sec}$) associated with the second radio. To determine the first allowable transmit power, the wireless device may determine the first exposure margin as a difference of one and the first exposure, for example, according to Expression (2). To determine the first allowable transmit power, the wireless device may determine the first allowable transmit power as a product of the first exposure margin and the first maximum time-averaged transmit power level, for example, according to Expression (3).

In certain aspects, the wireless device may determine a second exposure margin for the second radio as a difference of one and a third exposure margin (e.g., x) allocated to the first radio (e.g., 1−x). The wireless device may determine an available exposure margin as a difference of the third exposure margin allocated to the first radio (x) and the first exposure (e.g., x−norm.exp.first). The wireless device may determine the first exposure margin as a sum of the second exposure margin and the available exposure margin (e.g., (1−x)+(x-norm.exp.first)=(1−norm.exp.first)). In some cases, the third exposure margin allocated to the first radio may be one. The entire exposure margin may be allocated to a particular radio.

In some cases, the wireless device may determine the first allowable transmit power based on a duty cycle associated with the second radio, for example, according to Expression (4b). The duty cycle may represent the maximum amount of time the second radio is expected to transmit in a time period. If the duty cycle associated with the second radio is low (e.g., <50%), the second radio may be able to transmit at higher transmit powers. If the duty cycle associated with the second radio is high (e.g., >50%), the second radio may be allocated lower transmit power.

For certain aspects, the wireless device may determine a transmit power for a third radio or more radio(s), for example, as described herein with respect to FIG. 7A. The wireless device may determine a second exposure margin associated with a third radio for a third time interval (e.g., the third time interval 712) based on the first exposure margin and a second exposure associated with the second radio for a second transmission in the second time interval, for example, according to Expression (5). The wireless device may determine a second allowable transmit power associated with the third radio for the third time interval based on the second exposure margin and a second maximum time-averaged transmit power level (e.g., $P_{limit\_third}$) associated with the third radio, for example, according to Expression (6).

In some cases, the wireless device may determine a third exposure margin (e.g., 1−x−y) for the third radio as a difference of one and a sum of minimum exposure margins allocated to the first radio (x) and the second radio (y). The wireless device may determine an available exposure margin (e.g., norm.exp.margin.sec−norm.exp.sec) as a difference of the first exposure margin allocated to the second radio (norm.exp.margin.sec) and the second exposure (norm.exp.sec). The wireless device may determine the second exposure margin as a sum of the third exposure margin for the third radio and the available exposure margin (e.g., (1−x−y)+(norm.exp.margin.sec−norm.exp.sec)).

The wireless device may transmit a second signal at a second transmit power in the third time interval using the third radio based on the second allowable transmit power. For example, the second transmit power may be less than or equal to the second allowable transmit power. The third time interval may have the same duration as the second time interval or a different duration than the second time interval. The third time interval may be next to the second time interval in time, and the second time interval may be between the first time interval and the third time interval in time. In some cases, the wireless device may transmit a third signal in the third time interval using the first radio and a fourth signal in the third time interval using the second radio. In some cases, the wireless device may determine the second allowable transmit power based on a duty cycle associated with the third radio.

In certain aspects, the wireless device may reserve energy for some radios. For example, to determine the first allowable transmit power, the wireless device may determine the first allowable transmit power further based on a first power limit applied to the first radio, for example, according to Expressions (8) and (9). To determine the second allowable transmit power, the wireless device may determine the second allowable transmit power further based on a second power limit applied to the second radio, for example, according to Expressions (11)-(13).

For certain aspects, the wireless device may be assigned antenna groups with mutually exclusive RF exposures. The wireless device may determine a second allowable transmit power associated with a third radio associated with a first antenna group, where the first radio and the second radio are associated with a second antenna group. The second allowable transmit power may be determined independent of transmissions associated with the second antenna group.

In certain aspects, the radios may be associated with different frequency bands and corresponding RF exposure limits. For example, the wireless device may transmit a second signal using the first radio in a sub-6 GHz frequency band, the wireless device may transmit the first signal using the second radio in a mmWave frequency band.

For certain aspects, the wireless device may select the first radio among multiple radios based on one or more priorities associated with the radios. For example, the wireless device may select the first radio based on the first radio having a higher priority over the other radios. The first radio may have a higher transmission priority than the second radio. For example, the duty cycle may be representative of the priority, where the duty cycle of the first radio may be greater than the second radio. In some cases, a service type may be indicative of the priority. For example, the first radio may be used for transmitting interactive gaming traffic, whereas the second radio may be used for transmitting conversational voice traffic, such that the first radio has a higher transmission priority than the second radio, in such a scenario.

For certain aspects, the wireless device may allocate an exposure margin among radios. For example, the wireless device may determine a first exposure margin for a first radio and a second exposure margin for any other radios, where the sum of the first exposure margin and the second exposure margin may be less than or equal to a threshold (e.g., 1). The wireless device may allocate a portion of the second exposure margin to each of the other radios. In some cases, the wireless device may allocate even portions of the second exposure margin to each of the other radios (e.g., (1−norm-.exp.first)/(N−1), where N is the total number of radios). In certain cases, the allocation portion of the second exposure margin may vary among the other radios. The wireless device may determine a first allowable transmit power associated with the first radio based on the first exposure margin, and the wireless device may determine a second allowable transmit power associated with each of the other radios based on the respective portion of the second exposure margin. The wireless device may transmit a first signal at a first transmit power in a first time interval based on the first allowable transmit power, and the wireless device may transmit, for each of the other radios, a second signal at a second transmit power in a corresponding second time interval based on the respective second allowable transmit power.

While the examples depicted in FIGS. 1-8 are described herein with respect to a UE performing the various methods for providing RF exposure compliance to facilitate understanding, aspects of the present disclosure may also be applied to other wireless devices, such as a wireless station, an access point, a base station and/or a customer premises equipment (CPE), performing the RF exposure management described herein. Further, while the examples are described with respect to communications between the UE (or other wireless device) and a network entity, the UE or other wireless device may be communicating with a device other than a network entity, for example another UE or with another device in a user's home that is not a network entity, for example.

It will be appreciated that multi-radio RF exposure management described herein may enable desirable wireless communication performance, such as reduced latencies, increased uplink data rates, and/or increased range of communications, for example, due to the increased exposure margin that can be assigned to multiple radios.

Example Communications Device

Figure 9:
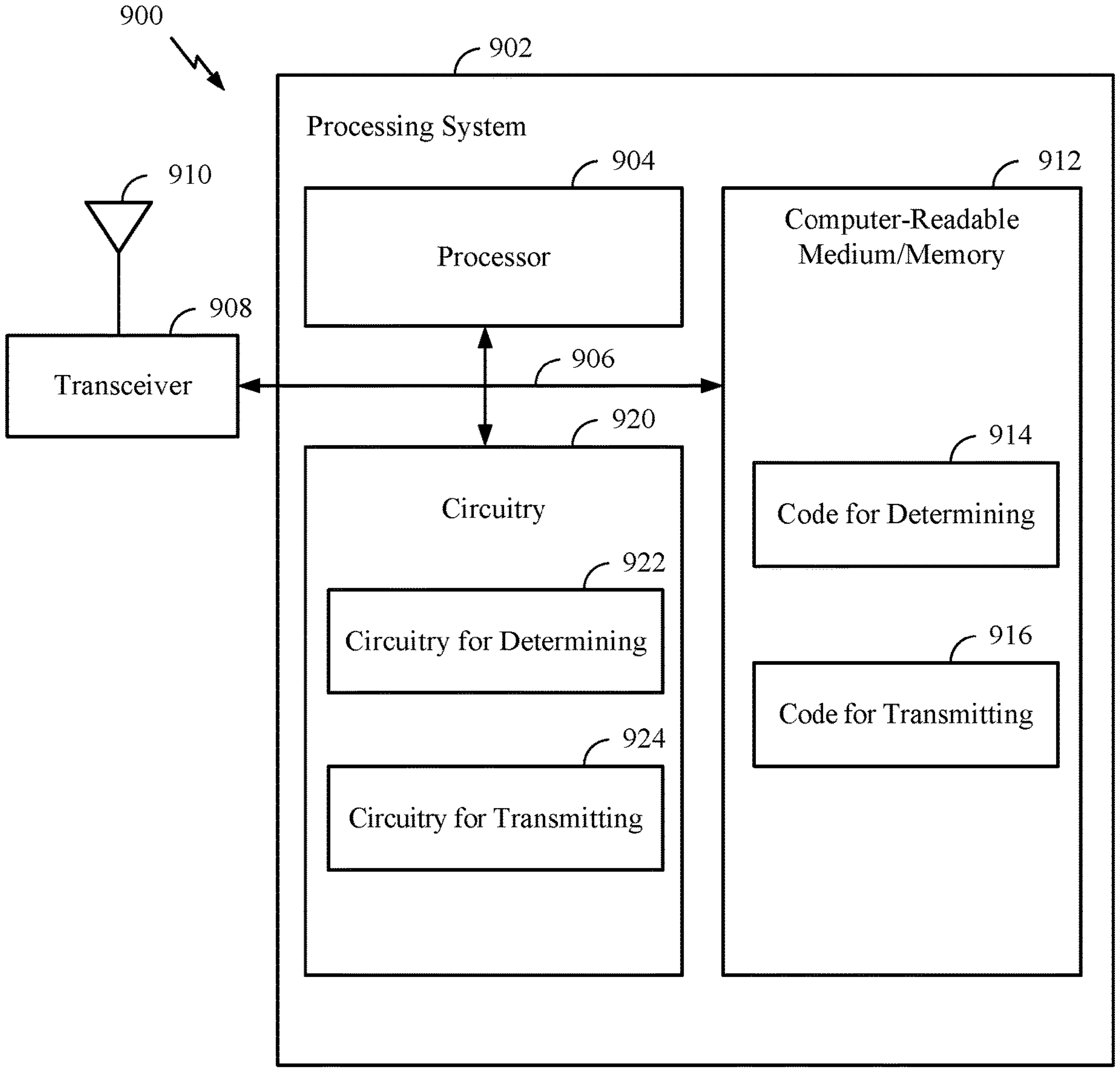
FIG. 9 illustrates a communications device (e.g., a UE) that may include various components configured to perform operations for the techniques disclosed herein, in accordance with certain aspects of the present disclosure.

FIG. 9 illustrates a communications device 900 (e.g., the UE 120) that may include various components (e.g., corresponding to means-plus-function components) configured to perform operations for the techniques disclosed herein, such as the operations illustrated in FIG. 8. The communications device 900 includes a processing system 902, which may be coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the communications device 900 to perform the operations 800 illustrated in FIG. 8, or other operations for performing the various techniques discussed herein for providing RF exposure compliance. In certain aspects, computer-readable medium/memory 912 stores code for determining 914, code for transmitting (or outputting) 916, or any combination thereof.

In certain aspects, the processing system 902 has circuitry 920 configured to implement the code stored in the computer-readable medium/memory 912. In certain aspects, the circuitry 920 is coupled to the processor 904 and/or the computer-readable medium/memory 912 via the bus 906. For example, the circuitry 920 includes circuitry for determining 922, circuitry for transmitting (or outputting) 924, or any combination thereof.

In some examples, means for transmitting or sending (or means for outputting for transmission) may include the transceivers 254 and/or antenna(s) 252 of the UE 120 illustrated in FIG. 2 and/or transceiver 908 and antenna 910 of the communications device 900 in FIG. 9.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining may include various processing system components, such as: the processor 904 in FIG. 9, or aspects of the UE 120 depicted in FIG. 2, including receive processor 258, transmit processor 264, TX MIMO processor 266, and/or controller/processor 280.

Example Aspects

Implementation examples are described in the following numbered clauses:

Aspect 1: A method of wireless communication by a wireless device, comprising: determining a first exposure associated with a first radio for a first transmission in a first time interval; determining a first allowable transmit power associated with a second radio for a second time interval based at least in part on the first exposure associated with the first radio; and transmitting a first signal at a first transmit power in the second time interval using the second radio based on the first allowable transmit power.

Aspect 2: The method of Aspect 1, wherein: determining the first exposure comprises determining the first exposure based at least in part on a first maximum time-averaged transmit power level associated with the first radio; and determining the first allowable transmit power comprises determining the first allowable transmit power further based on a second maximum time-averaged transmit power level associated with the second radio.

Aspect 3: The method of Aspect 1 or 2, further comprising transmitting a second signal at a second transmit power in the second time interval using the first radio, wherein the first radio has a higher transmission priority than the second radio, and the second time interval is next to the first time interval in time.

Aspect 4: The method of Aspect 3, wherein: the second transmit power is less than or equal to a second allowable transmit power; and the second allowable transmit power is based at least in part on an exposure margin allocated to the first radio and a first maximum time-averaged transmit power level associated with the first radio.

Aspect 5: The method of Aspect 4, further comprising determining the second allowable transmit power based on a duty cycle associated with the first radio.

Aspect 6: The method of Aspect 4 or 5, wherein the exposure margin allocated to the first radio is less than or equal to one.

Aspect 7: The method according to any of Aspects 1-6, wherein determining the first allowable transmit power is further based on a duty cycle associated with the second radio.

Aspect 8: The method according to any of Aspects 1-7, wherein determining the first allowable transmit power comprises: determining a first exposure margin associated with the second radio based on the first exposure associated with the first radio; and determining the first allowable transmit power based on the first exposure margin and a second maximum time-averaged transmit power level associated with the second radio.

Aspect 9: The method of Aspect 8, wherein determining the first allowable transmit power further comprises determining the first exposure margin as a difference of one and the first exposure.

Aspect 10: The method of Aspect 8 or 9, wherein determining the first exposure margin comprises: determining a second exposure margin for the second radio as a difference of one and a third exposure margin allocated to the first radio; and determining an available exposure margin as a difference of the third exposure margin allocated to the first radio and the first exposure; and determining the first exposure margin as a sum of the second exposure margin and the available exposure margin.

Aspect 11: The method of Aspect 10, wherein the third exposure margin allocated to the first radio is less than or equal to one.

Aspect 12: The method according to any of Aspects 8-11, wherein determining the first allowable transmit power further comprises determining the first allowable transmit power as a product of the first exposure margin and the second maximum time-averaged transmit power level.

Aspect 13: The method of Aspect 8, further comprising: determining a second exposure margin associated with a third radio for a third time interval based on the first exposure margin and a second exposure associated with the second radio for a second transmission in the second time interval; determining a second allowable transmit power associated with the third radio for the third time interval based on the second exposure margin and a second maximum time-averaged transmit power level associated with the third radio; and transmitting a second signal at a second transmit power in the third time interval using the third radio based on the second allowable transmit power.

Aspect 14: The method of Aspect 13, determining the second exposure margin comprises: determining a third exposure margin for the third radio as a difference of one and a sum of minimum exposure margins allocated to the first radio and the second radio; and determining an available exposure margin as a difference of the first exposure margin allocated to the second radio and the second exposure; and determining the second exposure margin as a sum of the third exposure margin for the third radio and the available exposure margin.

Aspect 15: The method of Aspect 13 or 14, wherein the third time interval has the same duration as the second time interval.

Aspect 16: The method according to any of Aspects 13-15, further comprising: transmitting a third signal in the third time interval using the first radio; and transmitting a fourth signal in the third time interval using the second radio, wherein the third time interval is next to the second time interval in time, and wherein the second time interval is between the first time interval and the third time interval in time.

Aspect 17: The method according to any of Aspects 13-16, wherein determining the second allowable transmit power comprises determining the second allowable transmit power further based on a duty cycle associated with the third radio.

Aspect 18: The method according to any of Aspects 13-17, wherein determining the second allowable transmit power comprises determining the second allowable transmit power further based on a second power limit applied to the second radio.

Aspect 19: The method according to any of Aspects 1-18, wherein determining the first allowable transmit power comprises determining the first allowable transmit power further based on a first power limit applied to the first radio.

Aspect 20: The method according to any of Aspects 1-19, further comprising determining a second allowable transmit power associated with a third radio associated with a first antenna group, wherein the first radio and the second radio are associated with a second antenna group.

Aspect 21: The method of Aspect 20, wherein the second allowable transmit power is determined independent of transmissions associated with the second antenna group.

Aspect 22: The method according to any of Aspects 1-21, further comprising transmitting a second signal using the first radio in a sub-6 GHz frequency band, wherein transmitting the first signal comprises transmitting the first signal using the second radio in a mmWave frequency band.

Aspect 23: The method according to any of Aspects 1-22, further comprising selecting the first radio among a plurality of radios based on one or more priorities associated with the radios.

Aspect 24: An apparatus comprising: one or more memories collectively storing executable instructions; and one or more processors coupled to the one or more memories, the one or more processors being collectively configured to execute the executable instructions and cause the apparatus to perform a method in accordance with any of Aspects 1-23.

Aspect 25: An apparatus comprising means for performing a method in accordance with any of Aspects 1-23.

Aspect 26: A non-transitory computer-readable medium comprising computer-executable instructions that, when executed by one or more processors of a processing system, cause the processing system to perform a method in accordance with any of Aspects 1-23.

Aspect 27: A computer program product embodied on a computer-readable storage medium comprising code for performing a method in accordance with any of Aspects 1-23.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (CMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, which may be narrowband IoT (NB-IOT) devices.

In some examples, access to the air interface may be scheduled. A scheduling entity (e.g., a BS) allocates resources for communication among some or all devices and equipment within the entity's service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, "a processor," "at least one processor," or "one or more processors" generally refer to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refer to a single memory configured to store data and/or instructions or multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (random access memory), flash memory, ROM (read-only memory), PROM (programmable read-only memory), EPROM (erasable programmable read-only memory), EEPROM (electrically erasable programmable read-only memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein, for example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:

determining a first exposure associated with a first radio for a first transmission in a first time interval;

determining a first allowable transmit power associated with a second radio for a second time interval based at least in part on the first exposure associated with the first radio; and transmitting a first signal at a first transmit power in the second time interval using the second radio based on the first allowable transmit power, wherein determining the first allowable transmit power comprises:

determining a first exposure margin associated with the second radio based on the first exposure associated with the first radio; and determining the first allowable transmit power based on the first exposure margin and a second maximum time-averaged transmit power level associated with the second radio.

2. The method of claim 1, wherein:

determining the first exposure comprises determining the first exposure based at least in part on a first maximum time-averaged transmit power level associated with the first radio.

3. The method of claim 1, further comprising transmitting a second signal at a second transmit power in the second time interval using the first radio, wherein the first radio has a higher transmission priority than the second radio, and the second time interval is next to the first time interval in time.

4. The method of claim 3, wherein:

the second transmit power is less than or equal to a second allowable transmit power; and the second allowable transmit power is based at least in part on an exposure margin allocated to the first radio and a first maximum time-averaged transmit power level associated with the first radio.

5. The method of claim 4, further comprising determining the second allowable transmit power based on a duty cycle associated with the first radio.

6. The method of claim 4, wherein the exposure margin allocated to the first radio is less than or equal to one.

7. The method of claim 1, wherein determining the first allowable transmit power is further based on a duty cycle associated with the second radio.

8. The method of claim 1, wherein determining the first allowable transmit power further comprises determining the first exposure margin as a difference of one and the first exposure.

9. The method of claim 1, wherein determining the first exposure margin comprises:

determining a second exposure margin for the second radio as a difference of one and a third exposure margin allocated to the first radio;

determining an available exposure margin as a difference of the third exposure margin allocated to the first radio and the first exposure; and determining the first exposure margin as a sum of the second exposure margin and the available exposure margin.

10. The method of claim 9, wherein the third exposure margin allocated to the first radio is less than or equal to one.

11. The method of claim 1, wherein determining the first allowable transmit power further comprises determining the first allowable transmit power as a product of the first exposure margin and the second maximum time-averaged transmit power level.

12. The method of claim 1, further comprising:

determining a second exposure margin associated with a third radio for a third time interval based on the first exposure margin and a second exposure associated with the second radio for a second transmission in the second time interval;

determining a second allowable transmit power associated with the third radio for the third time interval based on the second exposure margin and a second maximum time-averaged transmit power level associated with the third radio; and transmitting a second signal at a second transmit power in the third time interval using the third radio based on the second allowable transmit power.

13. The method of claim 12, determining the second exposure margin comprises:

determining a third exposure margin for the third radio as a difference of one and a sum of minimum exposure margins allocated to the first radio and the second radio;

determining an available exposure margin as a difference of the first exposure margin allocated to the second radio and the second exposure; and determining the second exposure margin as a sum of the third exposure margin for the third radio and the available exposure margin.

14. The method of claim 12, wherein the third time interval has a same duration as the second time interval.

15. The method of claim 12, further comprising:

transmitting a third signal in the third time interval using the first radio; and transmitting a fourth signal in the third time interval using the second radio, wherein the third time interval is next to the second time interval in time, and wherein the second time interval is between the first time interval and the third time interval in time.

16. The method of claim 12, wherein determining the second allowable transmit power comprises determining the second allowable transmit power further based on a duty cycle associated with the third radio.

17. The method of claim 12, wherein determining the second allowable transmit power comprises determining the second allowable transmit power further based on a second power limit applied to the second radio.

18. The method of claim 1, wherein determining the first allowable transmit power comprises determining the first allowable transmit power further based on a first power limit applied to the first radio.

19. The method of claim 1, further comprising determining a second allowable transmit power associated with a third radio associated with a first antenna group, wherein the first radio and the second radio are associated with a second antenna group.

20. The method of claim 19, wherein the second allowable transmit power is determined independent of transmissions associated with the second antenna group.

21. The method of claim 1, further comprising transmitting a second signal using the first radio in a sub-6 GHz frequency band, wherein transmitting the first signal comprises transmitting the first signal using the second radio in a mmWave frequency band.

22. The method of claim 1, further comprising selecting the first radio among a plurality of radios based on one or more priorities associated with the radios.

23. An apparatus for wireless communication, comprising:

one or more memories collectively storing executable instructions; and one or more processors coupled to the one or more memories, the one or more processors being collectively configured to execute the executable instructions to cause the apparatus to:

determine a first exposure associated with a first radio for a first transmission in a first time interval, determine a first allowable transmit power associated with a second radio for a second time interval based at least in part on the first exposure associated with the first radio, and control transmission of a first signal at a first transmit power in the second time interval using the second radio based on the first allowable transmit power, wherein to determine the first allowable transmit power, the one or more processors are collectively configured to execute the executable instructions to cause the apparatus to:

determine a first exposure margin associated with the second radio based on the first exposure associated with the first radio; and determine the first allowable transmit power based on the first exposure margin and a second maximum time-averaged transmit power level associated with the second radio.

24. The apparatus of claim 23, wherein:

to determine the first exposure, the one or more processors are collectively configured to execute the executable instructions to cause the apparatus to determine the first exposure based at least in part on a first maximum time-averaged transmit power level associated with the first radio.

25. The apparatus of claim 23, wherein:

the one or more processors are further collectively configured to execute the executable instructions to cause the apparatus to transmit a second signal at a second transmit power in the second time interval using the first radio;

the first radio has a higher transmission priority than the second radio; and the second time interval is next to the first time interval in time.

26. The apparatus of claim 25, wherein:

the second transmit power is less than or equal to a second allowable transmit power; and the second allowable transmit power is based at least in part on an exposure margin allocated to the first radio and a first maximum time-averaged transmit power level associated with the first radio.

27. The apparatus of claim 26, wherein the one or more processors are further collectively configured to execute the executable instructions to cause the apparatus to determine the second allowable transmit power based on a duty cycle associated with the first radio.

28. An apparatus for wireless communication, comprising:

means for determining a first exposure associated with a first radio for a first transmission in a first time interval;

means for determining a first exposure margin associated with a second radio based on the first exposure associated with the first radio;

means for determining a first allowable transmit power associated with the second radio for a second time interval based at least in part on the first exposure margin and a second maximum time-averaged transmit power level associated with the second radio; and means for transmitting a first signal at a first transmit power in the second time interval using the second radio based on the first allowable transmit power.

29. A non-transitory computer-readable medium having instructions stored thereon, which when executed by an apparatus, cause the apparatus to perform an operation comprising:

determining a first exposure associated with a first radio for a first transmission in a first time interval;

determining a first allowable transmit power associated with a second radio for a second time interval based at least in part on the first exposure associated with the first radio; and transmitting a first signal at a first transmit power in the second time interval using the second radio based on the first allowable transmit power, wherein determining the first allowable transmit power comprises:

determining a first exposure margin associated with the second radio based on the first exposure associated with the first radio; and determining the first allowable transmit power based on the first exposure margin and a second maximum time-averaged transmit power level associated with the second radio.

* * * * *